United States Patent
Hayes, Jr.

(10) Patent No.: US 11,924,205 B2
(45) Date of Patent: Mar. 5, 2024

(54) SYSTEMS AND METHODS FOR ACCOUNT SYNCHRONIZATION AND AUTHENTICATION IN MULTICHANNEL COMMUNICATIONS

(71) Applicant: LIVEPERSON, INC., New York, NY (US)

(72) Inventor: Marc F. Hayes, Jr., Atlanta, GA (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/144,658

(22) Filed: May 8, 2023

(65) Prior Publication Data

US 2023/0370449 A1 Nov. 16, 2023

Related U.S. Application Data

(60) Provisional application No. 63/340,244, filed on May 10, 2022.

(51) Int. Cl.
*H04L 29/00* (2006.01)
*H04L 9/40* (2022.01)

(52) U.S. Cl.
CPC .......... *H04L 63/0869* (2013.01); *H04L 63/10* (2013.01)

(58) Field of Classification Search
CPC ............................ H04L 63/0869; H04L 63/10
See application file for complete search history.

(56) References Cited

U.S. PATENT DOCUMENTS

| | | | |
|---|---|---|---|
| 8,955,076 B1* | 2/2015 | Faibish | H04L 63/0853 726/7 |
| 10,216,943 B2* | 2/2019 | Krishna | H04L 63/10 |
| 10,778,668 B2* | 9/2020 | Bhattacharya | H04L 63/083 |
| 11,677,679 B2* | 6/2023 | Bantke | H04L 67/1001 709/226 |
| 2003/0084165 A1* | 5/2003 | Kjellberg | H04L 67/1095 709/227 |
| 2003/0154406 A1* | 8/2003 | Honarvar | G07C 9/37 713/153 |
| 2007/0111708 A1* | 5/2007 | Dorenbosch | H04W 12/069 455/411 |
| 2008/0026724 A1* | 1/2008 | Zhang | H04W 12/06 455/411 |

(Continued)

OTHER PUBLICATIONS

International Search Report and Written Opinion dated Aug. 8, 2023 for PCT Application No. PCT/US2023/021371, 15 pages.

*Primary Examiner* — Don G Zhao
(74) *Attorney, Agent, or Firm* — POLSINELLI LLP

(57) ABSTRACT

Disclosed embodiments provide a framework to enable automatic identification and authentication of users to allow for multichannel communications in an authenticated state. In response to an authentication request from an end agent engaged in a communications session with a user, a current authentication state associated with the user is determined. Based on the current authentication state and a set of authentication rules associated with the end agent, a set of authentication challenges are identified and executed by an application implemented on the user's computing device. Data corresponding to completion of these authentication challenges is used to determine a new authentication state, which can be used to update the communications session.

30 Claims, 10 Drawing Sheets

(56) References Cited

U.S. PATENT DOCUMENTS

| | | | |
|---|---|---|---|
| 2008/0189212 A1* | 8/2008 | Kulakowski | G06Q 30/018 705/50 |
| 2011/0004926 A1* | 1/2011 | O'Donnell, III | H04L 9/3271 726/3 |
| 2011/0107090 A1* | 5/2011 | Varadarajan | H04L 9/3297 713/158 |
| 2014/0189829 A1 | 7/2014 | McLachlan et al. | |
| 2015/0149350 A1* | 5/2015 | Ananda Kumar | G06Q 20/14 705/40 |
| 2016/0105414 A1* | 4/2016 | Bringer | H04L 9/3247 713/168 |
| 2016/0226908 A1* | 8/2016 | McGeehan | H04L 63/1491 |
| 2016/0335637 A1* | 11/2016 | Deshpande | H04W 4/14 |
| 2017/0103194 A1* | 4/2017 | Wechsler | G06F 21/316 |
| 2017/0289134 A1* | 10/2017 | Bradley | H04L 63/105 |
| 2017/0289168 A1 | 10/2017 | Bar et al. | |
| 2018/0007066 A1* | 1/2018 | Goutal | H04L 63/1483 |
| 2018/0077199 A1* | 3/2018 | Tsao | G06F 21/44 |
| 2018/0302226 A1* | 10/2018 | Heimlicher | H04L 63/061 |
| 2019/0147416 A1* | 5/2019 | Rule | G06Q 20/0855 705/39 |
| 2019/0266589 A1* | 8/2019 | Tiwaree | G06Q 20/322 |
| 2019/0334921 A1* | 10/2019 | Pattar | H04L 9/3271 |
| 2020/0053120 A1* | 2/2020 | Wilcox | G06Q 10/107 |
| 2020/0065459 A1 | 2/2020 | Himabindu et al. | |
| 2020/0112526 A1* | 4/2020 | Moon | G06N 20/00 |
| 2021/0019755 A1* | 1/2021 | Omojola | G06Q 20/12 |
| 2021/0044976 A1* | 2/2021 | Avetisov | H04L 63/0815 |
| 2021/0058395 A1* | 2/2021 | Jakobsson | H04L 67/306 |
| 2021/0099484 A1* | 4/2021 | Li | G06F 16/2255 |
| 2021/0134110 A1* | 5/2021 | Irwin, Jr. | H04L 9/3263 |
| 2021/0160281 A1* | 5/2021 | Hallaji | H04L 63/083 |
| 2021/0192027 A1 | 6/2021 | Malton et al. | |
| 2022/0116374 A1* | 4/2022 | Nair | H04L 63/08 |
| 2022/0171825 A1* | 6/2022 | Brannon | G06F 21/6245 |
| 2022/0279019 A1* | 9/2022 | Kras | H04L 63/1483 |
| 2022/0414866 A1* | 12/2022 | Price | G06N 3/045 |

\* cited by examiner

SYSTEMS AND METHODS FOR ACCOUNT SYNCHRONIZATION AND AUTHENTICATION IN MULTICHANNEL COMMUNICATIONS

CROSS-REFERENCE TO RELATED APPLICATIONS

The present patent application claims the priority benefit of U.S. provisional patent application No. 63/340,244 filed May 10, 2022, the disclosures of which are incorporated by reference herein.

FIELD

The present disclosure relates generally to systems and methods for facilitating account synchronization, identification, and authentication among entities. More specifically, techniques are provided to deploy a framework to enable automatic identification and authentication of users to allow for multichannel communications in an authenticated state.

SUMMARY

Disclosed embodiments provide a framework for enabling automatic identification and authentication of users to allow for secure multichannel communications between users and brands. According to some embodiments, a computer-implemented method is provided. The computer-implemented method comprises receiving an authentication request to determine a current authentication state associated with a user for an ongoing communications session between the user and an end agent. The authentication request is associated with the end agent. The computer-implemented method further comprises determining the current authentication state associated with the user. The current authentication state corresponds to an authentication associated with the user and corresponding to a platform that facilitates the ongoing communications session between the user and the end agent. The computer-implemented method further comprises identifying one or more authentication challenges to obtain a required authentication associated with the user. These one or more authentication challenges are identified based on the current authentication state and a set of authentication rules associated with the end agent. The computer-implemented method further comprises generating the one or more authentication challenges according to the set of authentication rules. When the one or more authentication challenges are executed by an application associated with the platform and implemented on a computing device associated with the user, the application prompts the user to complete the one or more authentication challenges. The computer-implemented method further comprises obtaining data corresponding to completion of the one or more authentication challenges. The computer-implemented method further comprises determining a new authentication state associated with the user. This new authentication state is determined based on the data. The computer-implemented method further comprises updating the ongoing communications session according to the new authentication state.

In some embodiments, the computer-implemented method further comprises dynamically training a machine learning algorithm to determine a predicted level of authentication required for the ongoing communications session. The machine learning algorithm is trained using a dataset of communications exchanged between users and end agents during sample communications sessions and corresponding authentication requirements. The computer-implemented method further comprises processing in real-time communications exchanged between the user and the end agent during the ongoing communications session through the machine learning algorithm to identify the one or more authentication challenges; and updating the machine learning algorithm using feedback corresponding to the one or more authentication challenges, the predicted level of authentication, and the new authentication state.

In some embodiments, the computer-implemented method further comprises providing an identity request to obtain identity information associated with the user. When the identity request is received at the application, the application prompts the user to release the identity information.

In some embodiments, the computer-implemented method further comprises providing identity information associated with the user such that when the identity information is received by the end agent, the end agent establishes a new account for the user and one or more identifiers corresponding to the new account. The computer-implemented method further comprises associating the one or more identifiers with the set of authentication rules associated with the end agent.

In some embodiments, the computer-implemented method further comprises validating a set of credentials corresponding to an account associated with the user and the end agent. The set of credentials are validated using an OAuth server associated with the end agent. The computer-implemented method further comprises storing one or more identifiers corresponding to the account. The one or more identifiers are provided by the OAuth server.

In some embodiments, the one or more authentication challenges include a request for biometric information associated with the user.

In some embodiments, the one or more authentication challenges include a request for verification of government-issued credentials associated with the user.

In some embodiments, the authentication request includes the set of authentication rules associated with the end agent.

In some embodiments, the authentication request includes an identifier corresponding to the end agent. Further, the identifier corresponding to the end agent is used to identify the set of authentication rules associated with the end agent.

In some embodiments, the computer-implemented method further comprises providing a set of tokenized account identifiers in response to the completion of the one or more authentication challenges. The set of tokenized account identifiers correspond to an account associated with the user and the end agent. Further, the set of tokenized account identifiers are used to authenticate the user for other communications sessions between the user and the end agent.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
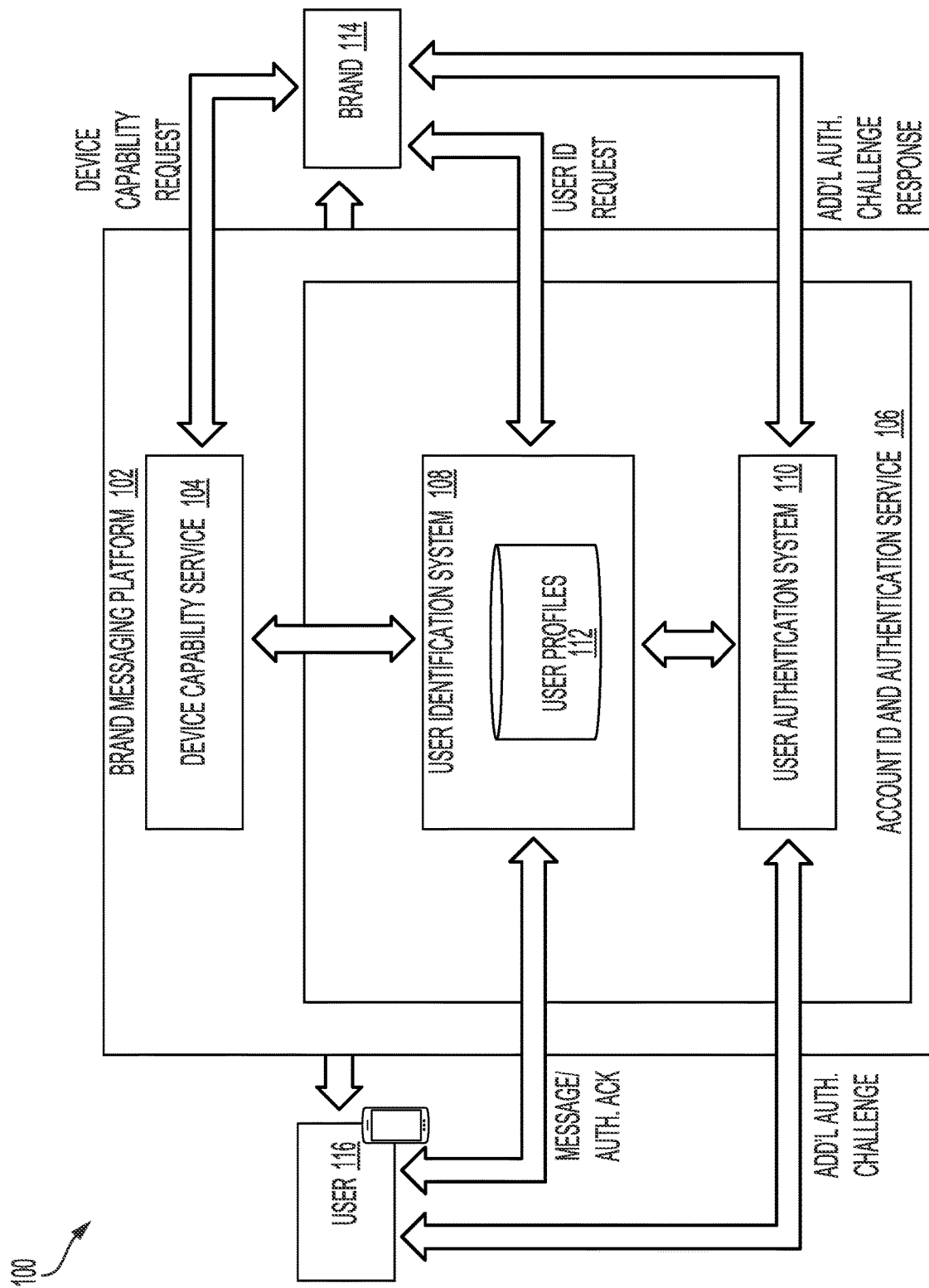
FIG. 1 shows an illustrative example of an environment in which a brand messaging platform, in conjunction with an account identification and authentication service, synchronizes user identity and authentication between a user and a brand during a communications session in accordance with at least one embodiment.

FIG. 1 shows an illustrative example of an environment 100 in which a brand messaging platform 102, in conjunction with an account identification and authentication service 106, synchronizes user identity and authentication between a user 116 and a brand 114 during a communications session in accordance with at least one embodiment. In the environment 100, a user 116 of the brand messaging platform 102 may be engaged in a communications session with a brand 114 via the brand messaging platform 102. The brand messaging platform 102 may allow users and brands to connect in order to provide recommendations and advice with regard to intents submitted by these users. An intent may (for example) be a topic, sentiment, complexity, and/or level of urgency. A topic can include, but is not limited to, a subject, a product, a service, a technical issue, a use question, a complaint, a refund request or a purchase request, etc. In some instances, the brand messaging platform 102 may use an intent submitted by the user to identify the brand 114 in order to provide the user with a relevant response to the intent. If the user determines that it wishes to engage with the brand 114, the brand messaging platform 102 may establish the communications session between the user 116 and the brand 114. In some instances, the user may use an intent messaging application provided by the brand messaging platform 102 to engage in the communications session with the brand 114. Through this communications session, the user 116 and the brand 114 may exchange messages or other information with regard to the intent submitted by the user 116. The communications session may include a voice call (e.g., telephone call, etc.), a video call, a text-based communication session (e.g., Short Message Service (SMS) messaging, Rich Communication Services (RCS) messaging, instant messaging, etc.), and the like.

The communications session established by the brand messaging platform 102 between the user 116 and the brand 114 may be implemented subject to a Rich Communication Services (RCS) protocol or other multimedia protocol through which the user 116 and the brand 114 may exchange rich messages or other in-call multimedia. In some instances, the communications session may be established as a voice call or video call, through which the user 116 may interact with the brand 114. Alternatively, the communications session may be established as an instant messaging or other form of chat messaging, through which the user 116 and brand 114 may exchange text-based messages over the communications session.

During the communications session between the user 116 and the brand 114, the brand 114 may determine that a payment is required from the user 116 in order to provide the user 116 with goods and/or services of the brand 114. For instance, the brand 114 may determine that in order for the brand 114 to address the intent submitted by the user 116, the user 116 may be required to purchase one or more items or utilize one or more services provided by the brand 114. Through the communications session, the brand 114 may promote these goods and/or services and prompt the user 116 to determine whether the user 116 would like to purchase said goods and/or services. If the user 116 indicates that it wants to purchase any of these goods and/or services, the brand 114 may determine whether the user 116 is able to provide payment for said goods and/or services via rich messaging and/or the intent messaging application. Additionally, the brand 114 may determine whether identification and authentication of the user 116 is required in order to provide said goods and/or services.

As illustrated in FIG. 1, if a payment is required from the user 116, the brand 114 may transmit a request to a device capability service 104 of the brand messaging platform 102 to identify the capabilities of the user's computing device (e.g., the computing device utilized by the user 116 to engage the brand 114 through the communications session) to submit payments using rich messaging via the RCS protocol or through the intent messaging application implemented on the computing device. The device capability service 104 may comprise one or more computer systems of the brand messaging platform 102 or may be implemented as an application or process executing on a computer system of the brand messaging platform 102. The request from the brand 114 may include identifying information of the customer. To obtain this identifying information of the customer, the brand 114 may solicit information from the user 116 that may be used by the brand messaging platform 102 to identify the user 116 and query an account of the user 116. For instance, the brand 114, via the communications session, may ask the user 116 for its username or other user identifier associated with the brand messaging platform 102. Alternatively, if the communications session between the user 116 and the brand 114 is brokered via the brand messaging platform 102, the device capability service 104 may obtain the user's identifier from the brand messaging platform 102.

In an embodiment, in addition to transmitting a request to the device capability service 104, the brand 114 submits a request to an account identification and authentication service 106 to verify the identity of the user 116 and to authenticate the user 116 according to the authentication requirements of the brand 114. The account identification and authentication service 106 may comprise one or more computer systems of the brand messaging platform 102 or may be implemented as an application or process executing on a computer system of the brand messaging platform 102. As illustrated in FIG. 1, the account identification and authentication service 106 may include a user identification system 108 that is implemented to verify the identity of a user according to the authentication methods implemented by the brand messaging platform 102 and to provide brands with identifying information corresponding to the users interacting with these brands. Additionally, the user identification system 108 may maintain a user profile datastore 112 that stores thereon a user profile for each user of the brand messaging platform 102. A user profile within the user profile datastore 112 may indicate a user identifier corresponding to a user account associated with the brand messaging platform 102, user identifiers and/or tokens corresponding to user accounts associated with different brands, a corresponding user's authentication status with regard to authentication performed by the brand messaging platform 102, the type of authentication performed by the brand messaging platform 102 (e.g., government credential authentication performed, username and password authentication performed, type and time of authentication challenge performed, etc.), and the like.

In an embodiment, the user identification system 108 is implemented using a computer system associated with the account identification and authentication service 106. In some instances, the user identification system 108 may be implemented as an application or other executable process executed on a computer system associated with the account identification and authentication service 106. In some embodiments, the user identification system 108 is implemented as a special purpose computing device that comprises specialized components (as described in greater detail herein) that are configured to perform the various operations described herein.

In an embodiment, the user identification system 108 maintains, in the user profile datastore 112, a set of brand authentication rules for each brand associated with the brand messaging platform 102. A set of brand authentication rules for a particular brand (e.g., brand 114) may define the level of identification and authentication required for the brand 114 to deem a user 116 to be authenticated for the communications session between the user 116 and the brand 114. For instance, a brand 114 may define a set of brand authentication rules whereby government credential authentication of a user 116 is required in order for the user 116 to be deemed authenticated for the communications session. As another illustrative, but non-limiting example, a brand 114 may define a set of brand authentication rules whereby the standard authentication methods performed by the brand messaging platform 102 to authenticate a user 116 are deemed adequate for the user 116 to be deemed authenticated for the communications session. The set of brand authentication rules may be defined for different types of communications sessions or for different request types. For example, if the communications session is directed towards the exchange of messages between the user 116 and the brand 114 to address an intent, the brand 114 may deem the user 116 to be properly authenticated according to the authentication methods performed by the brand messaging platform 102. However, for communications sessions where the user 116 is required to provide payment to the brand 114 and/or for which sensitive subjects are to be discussed, the brand 114 may require more stringent or additional authentication of the user 116. Accordingly, for such communications sessions, the brand 114 may define a rule whereby the more stringent or additional authentication is performed.

In an embodiment, the set of brand authentication rules can be provided by the brand 114 in its request to the user identification system 108 to verify the identity of the user 116 and to authenticate the user 116 according to the authentication requirements of the brand 114. For instance, if the brand 114 determines, based on the communications between the user 116 and the brand 114 during the communications session, that verification of the user's identity and corresponding authentication of the user 116 is required, the brand 114 may define the set of brand authentication rules. The brand 114 may include the newly defined set of brand authentication rules in its request to the user identification system 108 to verify the identity of the user 116 and to determine the authentication status of the user 116. In an embodiment, in response to receiving the set of brand authentication rules, the user identification system 108 can update the user profile datastore 112 to associate the set of brand authentication rules with the brand 114. Thus, for subsequent requests from the brand 114 to verify the identity of a user and to determine the authentication status of the user, the user identification system 108 may identify and refer to these brand authentication rules.

Figure 5:
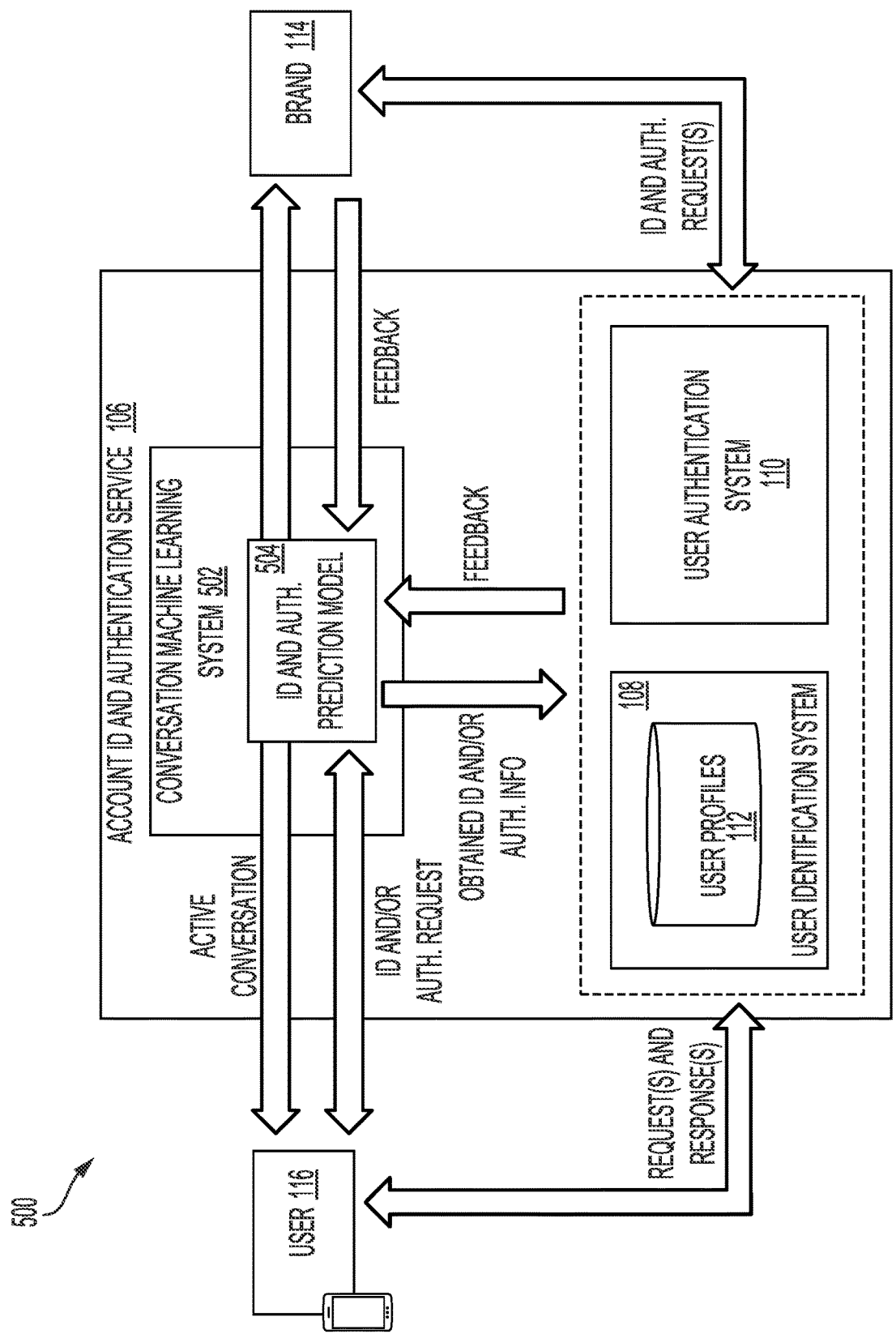
FIG. 5 shows an illustrative example of an environment in which a conversation machine learning system is implemented to dynamically predict identification and authentication requirements for an ongoing communications session between a user and a brand in accordance with at least one embodiment.
Figure 6:
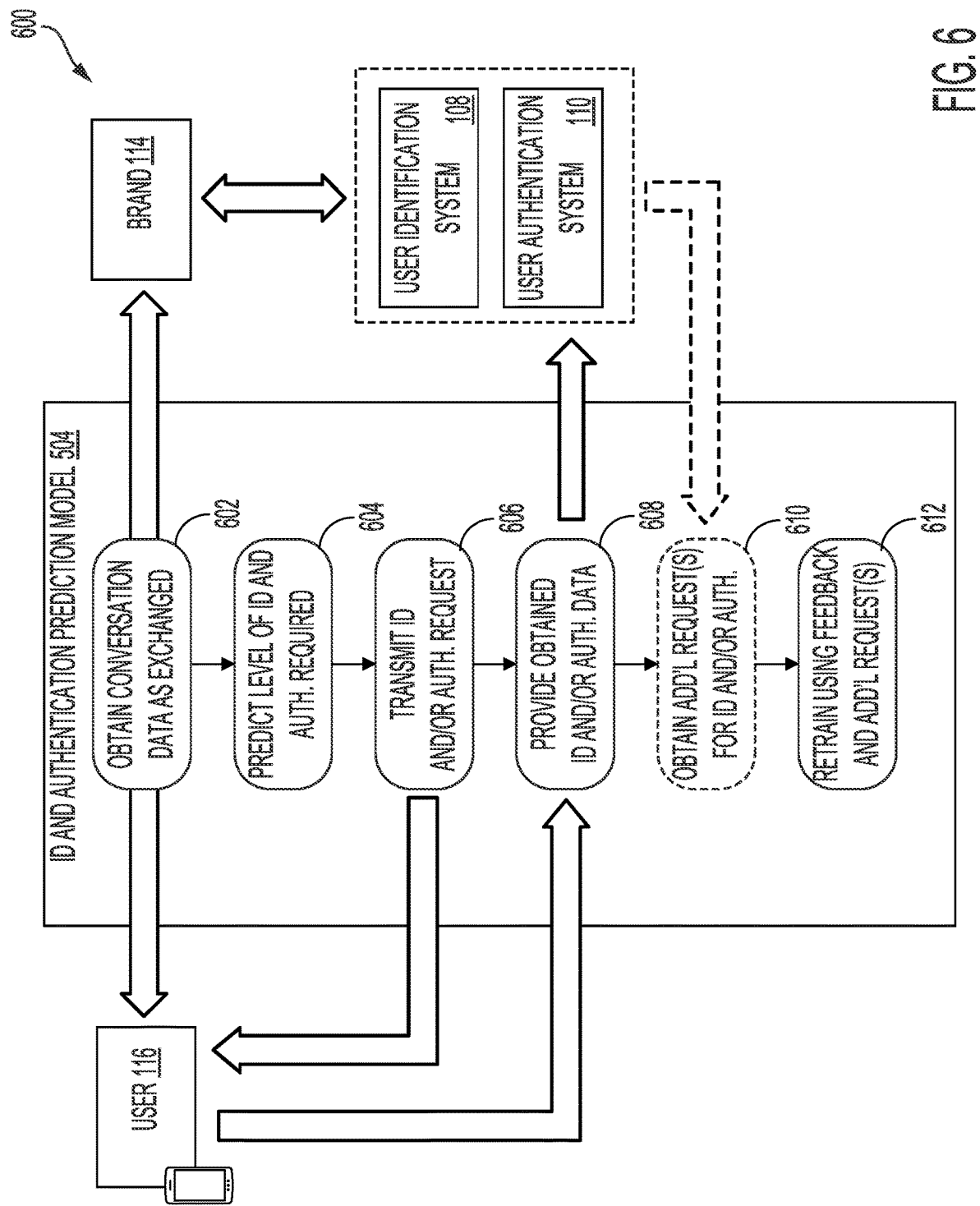
FIG. 6 shows an illustrative example of an environment in which an identification and authentication prediction model processes communications between users and brands during communications sessions to predict identification and authentication requirements for the communications sessions in accordance with at least one embodiment.

In an embodiment, the account identification and authentication service 106 implements a machine learning algorithm (e.g., the identification and authentication prediction model 504 described herein in connection with FIGS. 5 and 6) that is dynamically trained to predict the level of identification and authentication required for a given communications session between a user 116 and a brand 114. For instance, as messages or communications are exchanged between a user 116 and a brand 114 during a communications session, the machine learning algorithm may, in real-time, continuously process these messages or communications to predict the level of identification and authentication that may be required from the user 116 for the communications session. The machine learning algorithm implemented by the account identification and authentication service 106 may be trained using supervised learning techniques. For instance, a dataset of input messages and/or communications associated with different communications sessions (including simulated and/or actual communications sessions) and corresponding identification and authentication requirements can be selected for training of the machine learning algorithm. In some examples, the input messages and/or communications can be obtained from administrators of the brand messaging platform 102, a repository of previous communications sessions between users and brands maintained of the brand messaging platform 102, or other sources associated with the brand messaging platform 102. In some implementations, identification and authentication requirements used to train the machine learning algorithm may include requirements provided by the brands engaged in the sample communications sessions or by other entities associated with simulated communications sessions used for training of the machine learning algorithm. The machine learning algorithm may be evaluated to determine, based on the input sample messages and/or communications corresponding to communications sessions supplied to the machine learning algorithm, whether the machine learning algorithm is accurately predicting the level of identification and authentication for each of the sample communications sessions. Based on this evaluation, the machine learning algorithm may be modified (e.g., one or more parameters or variables associated with the machine learning algorithm may be updated) to increase the likelihood of the machine learning algorithm in accurately predicting the identification and authentication requirements for an active communications session.

It should be noted that the machine learning algorithm implemented by the account identification and authentication service 106 may automatically, and in real-time, generate and provide predicted levels of identification and authentication for myriad communications sessions that may be occurring at the same time amongst different users and brands. For instance, the machine learning algorithm may be dynamically trained, in real-time, to simultaneously obtain conversation data corresponding to myriad different communications sessions amongst different users and different brands as communications are exchanged within these different communications sessions. The machine learning algorithm may continuously, and in real-time, process these communications corresponding to multiple and distinct communications sessions simultaneously and as the communications are received to automatically predict the level of identification and authentication required for each of these communications sessions.

As noted above, the machine learning algorithm may, in real-time, continuously process communications between a user 116 and a brand 114 to predict the level of identification and authentication that may be required for the communications session. In an embodiment, the user identification system 108 continuously evaluates the level of identification and authentication predicted by the machine learning algorithm to determine whether additional identification and authentication of the user 116 is required for the communications session. For instance, if the user identification system 108 maintains, in the user profile datastore 112, a set of brand authentication rules provided by the brand 114, the user identification system 108 may evaluate the set of brand authentication rules against the predicted level of identification and authentication for the communications session between the brand 114 and the user 116 to determine whether the predicted level of identification and authentication is more stringent than that defined in the brand authentication rules. If so, the user identification system 108 may transmit a notification to the brand 114 with regard to the predicted level of identification and authentication identified by the machine learning algorithm. This may allow the brand 114 to determine whether to submit a request to the user identification system 108 to perform additional identification and authentication of the user 116 in order to allow for the communications session with the user 116 to continue. If the brand 114 determines that the predicted level of identification and authentication is accurate for the communications session, the user identification system 108 may update the brand authentication rules to incorporate the predicted level of identification and authentication into the rules. In an embodiment, the response from the brand 114 with regard to the predicted level of identification and authentication can be used as feedback to further train the machine learning algorithm. For example, if the brand 114 rejects the predicted level of identification and authentication identified by the machine learning algorithm (e.g., the current level of identification and authentication for the user 116 is acceptable), the machine learning algorithm may be re-trained to reduce the likelihood of similar predictions being provided for similar communications sessions and/or for similar users and brands. Alternatively, if the brand 114 accepts the predicted level of identification and authentication (e.g., the brand 114 submits a request to perform additional user identification and authentication according to the predicted level), the machine learning algorithm may be reinforced to maintain or increase the likelihood of similar predictions being provided for similar communications sessions and/or for similar users and brands.

In addition to generating and providing predicted levels of identification and authentication for different communications sessions that may be occurring simultaneously as communications are exchanged during these communications sessions, the machine learning algorithm may be dynamically updated or retrained in real-time as feedback is received from different brands corresponding to the predicted levels of identification and authentication provided for different communications sessions amongst different users and these different brands. For instance, as the account identification and authentication service 106 obtains responses from different brands corresponding to the predicted levels of identification and authentication generated by the machine learning algorithm for corresponding communications sessions associated with different users, the account identification and authentication service 106 may automatically, and in real-time, use these responses as feedback that may be used to dynamically update or re-train the machine learning algorithm. Thus, the machine learning algorithm may be continuously updated or re-trained, automatically and in real-time, as responses are received from different brands and corresponding to different communications sessions for which predicted levels of identification and authentication were provided. Further, this may allow for the continued expansion of the dataset used to dynamically train the machine learning algorithm such that the one or more parameters or variables associated with the machine learning algorithm can be dynamically updated in real-time to continuously improve the accuracy of the machine learning algorithm in generating predicted levels of identification and authentication for different communications sessions.

In an embodiment, if the brand 114 submits a request to the user identification system 108 to verify the identity of the user 116 and to authenticate the user 116 according to the authentication requirements of the brand 114, the user identification system 108 accesses the user profile datastore 112 to identify a user profile corresponding to the user 116. The request to the user identification system 108 may include a brand identifier corresponding to the brand 114. This brand identifier may be used to determine whether the brand messaging platform 102 has an existing record corresponding to a user-to-brand relationship (e.g., token corresponding to a user account associated with the brand 114, one or more identifiers corresponding to a user account associated with the brand 114, etc.). In an embodiment, the user identification system 108 can use automatic number identification (ANI) to automatically determine a telephone number of the user 116. The user identification system 108 can use the telephone number of the user 116 to identify the user profile from the user profile datastore 112. In some instances, the user identification system 108 may obtain a user identifier corresponding to the user 116 and associated with the user profile from the device capability service 104.

In response to the request, the user identification system 108 may provide an acknowledgement to the brand 114 that includes information corresponding to the user profile from the user profile datastore 112. For instance, the user identification system 108 may provide the brand 114 with a user identifier (e.g., a decentralized identity service user identifier, a user identifier corresponding to the user account maintained by the brand messaging platform 102, etc.), a known user account identifier or token for the user 116 and associated with the brand 114, the identification and authentication status of the user 116 (e.g., authentication performed by the brand messaging platform 102 based on platform requirements, prior authentication performed according to brand authentication rules associated with the brand 114 or other brands, etc.), the level of identification and authentication performed, and the like. The brand 114 may evaluate the acknowledgement provided by the user identification system 108 to determine whether additional identification and authentication of the user 116 is required in order to continue the communications session. If the brand 114 determines that the current level of identification and authentication is adequate for the communications session, the user identification system 108 may allow the communications session to continue without additional identification and authentication challenges to the user 116.

If the brand 114 determines that additional user identification and authentication is required for the communications session, the brand 114 may submit a request to the user identification system 108 to perform additional user identification and authentication in order to successfully authenticate the user 116 for the communications session. In response to the request, the user identification system 108 may determine what authentication challenges may be required in order to authenticate the user 116 according to the brand's requirements. For example, if the user 116 has been authenticated by the brand messaging platform 102 based on a username and password supplied by the user 116 through the intent messaging application provided by the brand messaging platform 102 but the brand 114 is requiring biometric authentication of the user 116, the user identification system 108 may transmit a request to a user authentication system 110 of the account identification and authentication service 106 to perform biometric authentication of the user 116. As another illustrative, but non-limiting example, if the brand 114 requires authentication through verification of government-issued credentials (e.g., driver's license, passport, Uniformed Services ID card, etc.), the user identification system 108 may transmit a request to the user authentication system 110 to prompt the user 116 to provide information corresponding to these government-issued credentials (e.g., a scan, identifiers corresponding to the government-issued credentials, etc.).

The user authentication system 110 is implemented using a computing system, application, or executable process of the account identification and authentication service 106 to execute any required authentication challenges and to provide responses to brands regarding the authentication of users. In response to the request from the user identification system 108, the user authentication system 110 may transmit instructions to the intent messaging application to perform the additional authentication challenges. For example, if the user 116 is required to complete biometric authentication in order to continue the communications session with the brand 114, the user authentication system 110 may transmit instructions to the intent messaging application to execute a facial recognition system or other biometric authentication system (e.g., fingerprint scanning, retinal scanning, etc.) to capture and analyze a real-time image of the user 116 in order to authenticate the user 116. The results of this biometric authentication may be provided to the user authentication system 110, which may, in turn, provide the results to the brand 114. These results may indicate whether the user 116 has been successfully authenticated according to the additional biometric authentication requirements of the brand 114. As another illustrative, but non-limiting example, if the brand 114 requires the user 116 to provide and have authenticated a set of government-issued credentials, the user authentication system 110 may transmit instructions to the intent messaging application to prompt the user 116 for data corresponding to their government-issued credentials. This may include prompting the user 116 to capture images of their government-issued credentials, provide identifying information associated with the government-issued credentials (e.g., driver's license number, passport number, etc.), scan their government-issued credentials (e.g., barcode scan, Quick Response (QR) code scan, etc.), and the like.

The data obtained by intent messaging application and corresponding to the user 116, in some instances, may be provided to the user authentication system 110 for verification and authentication. For example, if the intent messaging application obtains data corresponding to a user's government-issued credentials, the user authentication system 110 may evaluate this data to determine whether it is valid. In some instances, the user authentication system 110 may query a decentralized identity service or other identity service associated with the government-issued credentials to verify the authenticity of the provided data and to determine whether the data corresponds to the user 116. If the user authentication system 110 determines that the provided data cannot be authenticated (e.g., the data is invalid, the data does not correspond to the user 116, the data cannot be corroborated by the identity service, etc.), the user authentication system 110 may transmit a notification to the brand 114 to indicate that the user 116 could not be authenticated. In some examples, if authentication is performed on behalf of the user authentication system 110 via the intent messaging application, and the intent messaging application determines that the user 116 cannot be authenticated, the intent messaging application may transmit a notification to the brand to indicate that the user 116 could not be authenticated.

If the user 116 is successfully authenticated by the user authentication system 110 (either through verification of data provided by the user through an identity service or through verification performed by the intent messaging application), the user authentication system 110 may transmit a notification to the brand to indicate that the user 116 has been authenticated. For instance, if the additional authentication challenges are performed by the intent messaging application in accordance with instructions provided by the user authentication system 110, the intent messaging application may transmit a notification to the brand 114 to indicate that the user 116 has been successfully authenticated according to the brand's authentication requirements. Similarly, if authentication of the user 116 is performed by the user authentication system 110 based on data provided by the user 116 through the intent messaging application, the user authentication system 110 may transmit a notification to the brand 114 to indicate that the user 116 has been authenticated according to the brand's authentication requirements.

In some instances, the account identification and authentication service 106 may not have a record of an existing relationship between the brand 114 and the user 116. As noted above, in response to the request from the brand 114 to verify the identity of the user 116 and to authenticate the user 116 according to the authentication requirements of the brand 114, the user identification system 108 may access the user profile datastore 112 to identify a user profile corresponding to the user 116. This request may include a brand identifier corresponding to the brand 114. This brand identifier may be used to determine whether the brand messaging platform 102 has an existing record corresponding to a user-to-brand relationship. If the user identification system 108 determines that the user profile datastore 112 does not maintain a record corresponding to the user-to-brand relationship but does maintain, for the user 116, a user account associated with the brand messaging platform 102, the user identification system 108 may transmit an acknowledgement to the brand 114 that the user 116 is known to the brand messaging platform 102.

In response to the acknowledgement from the user identification system 108, the brand 114 may transmit a request to the user identification system 108 to release information from the user account to the brand 114 for creation of a user-to-brand relationship (e.g., a new user account for the user 116 and that is associated with the brand 114, etc.). In response to the request, the user identification system 108 may transmit instructions to the intent messaging application used by the user 116 to access the brand messaging platform 102 to prompt the user 116 to authorize release of the information from the user account to the brand 114. If the user 116 does not authorize release of the information from the user account to the brand 114, the user identification system 108 may transmit a response to the brand 114 indicating that the user 116 has not authorized release of the requested information. This may cause the brand 114 to determine that the user 116 cannot be authenticated and/or that the communications session with the user 116 cannot be continued, as the brand 114 is unable to establish a new account for the user 116.

If the user 116 authorizes release of the information from the user account to the brand 114, the user identification system 108 may transmit, to the brand 114, the requested information from the user account stored in the user profile datastore 112. The brand 114 may use this information to establish a new account for the user 116 and that is associated with the brand 114. The brand 114 may provide user identifiers and/or tokens corresponding to the newly created user account to the user identification system 108, which may store these user identifiers and/or tokens in the user profile datastore 112 in association with the user's profile. In some instances, if the brand 114 maintains a set of brand authentication rules that are to be met in order for the user 116 to be deemed authenticated by the brand 114, the user identification system 108 may further associate these brand authentication rules with the user identifiers and/or tokens associated with the newly created account. Once the newly created account has been created and associated with the user's profile in the user profile datastore 112, the user identification system 108, through the intent messaging application, may display a message to the user 116 indicating that a new account has been created with the brand 114 and the account identifiers and/or tokens corresponding to this new account. Thus, if the brand 114 requires user authentication for a communications session between the user 116 and the brand 114 through the brand messaging platform 102, the user identification system 108 may identify this newly created account and the corresponding brand authentication rules for authentication of the user 116 for the communications session.

In some examples, the user 116 may have an existing relationship with the brand 114 (e.g., an existing user account associated with the brand 114, etc.) but the account identification and authentication service 106 may not maintain a record of this existing relationship. For instance, in response to a brand request to verify the identity of the user 116 and to authenticate the user 116 according to the authentication requirements of the brand 114, the user identification system 108 may indicate that there is no record of the relationship between the user 116 and the brand 114 (e.g., the user profile associated with the user 116 does not include information corresponding to an existing user account associated with the brand 114, etc.). In an embodiment, if the user identification system 108 determines that it does not have a record of the existing relationship between the user 116 and the brand 114, the user identification system 108 can transmit a request to the user 116 (such as through the intent messaging application) to provide their user account credentials corresponding to the user account associated with the brand 114.

In response to obtaining the user account credentials from the intent messaging application, the user identification system 108 may determine whether these user account credentials are valid. For example, the user identification system 108 may transmit the user account credentials to an authentication server associated with the brand 114 (e.g., an OAuth server, etc.) for user authentication. If the user credentials are valid, the authentication server associated with the brand 114 may return a token corresponding to the user account associated with the brand 114. In some instances, the user identification system 108 may transmit the received token to the brand 114 to verify that the token is associated with the user account associated with the brand 114. If so, the user identification system 108 may persist the token, along with the provided user account credentials, within the user profile associated with the user 116 and stored within the user profile datastore 112.

In an embodiment, the brand messaging platform 102 implements an automated voice agent that facilitates the communications session between the user 116 and the brand 114. As noted above, the brand messaging platform 102 may use an intent submitted by the user to identify the brand 114 in order to provide the user 116 with a relevant response to the intent. In an illustrative, but non-limiting example, the automated voice agent implemented by the brand messaging platform 102 may automatically, and dynamically, determine, based on the intent submitted by the user 116 and the brand 114 identified by the brand messaging platform 102, that user identification and authentication are required in order to facilitate the communications session between the user 116 and the brand 114. The automated voice agent may utilize the machine learning algorithm described above and that is dynamically trained to predict the level of identification and authentication required for a given communications session between a user 116 and a brand 114 to determine whether user identification and authentication are required for the communications session.

If the automated voice agent determines that user identification and authentication are required for the communications session, the automated voice agent, through the intent messaging application, may prompt the user 116 to provide their user account credentials corresponding to the user account associated with the brand 114. If the user 116 provides their user account credentials, the user identification system 108 may validate these credentials against the authentication server associated with the brand 114 (e.g., an OAuth server, etc.), as described above. Once the user 116 has been authenticated, the user identification system 108 may prompt the user 116 to retain a set of tokenized account identifiers that may be used for future interactions with the brand 114 through the brand messaging platform 102. The user identification system 108 may retain these tokenized account identifiers within the user profile datastore 112 within the user's profile. Thus, if at a later time the user 116 wishes to establish a communications session with the brand 114 in order to address an intent, the user 116, through the intent messaging application, may automatically provide the tokenized account identifiers to the user identification system 108. This may allow the user identification system 108 to verify the identity of the user 116 and to authenticate the user 116 without having to prompt the user for their account credentials associated with the user-to-brand relationship (e.g., a user account for the user 116 that is associated with the brand 114, etc.).

Figure 2:
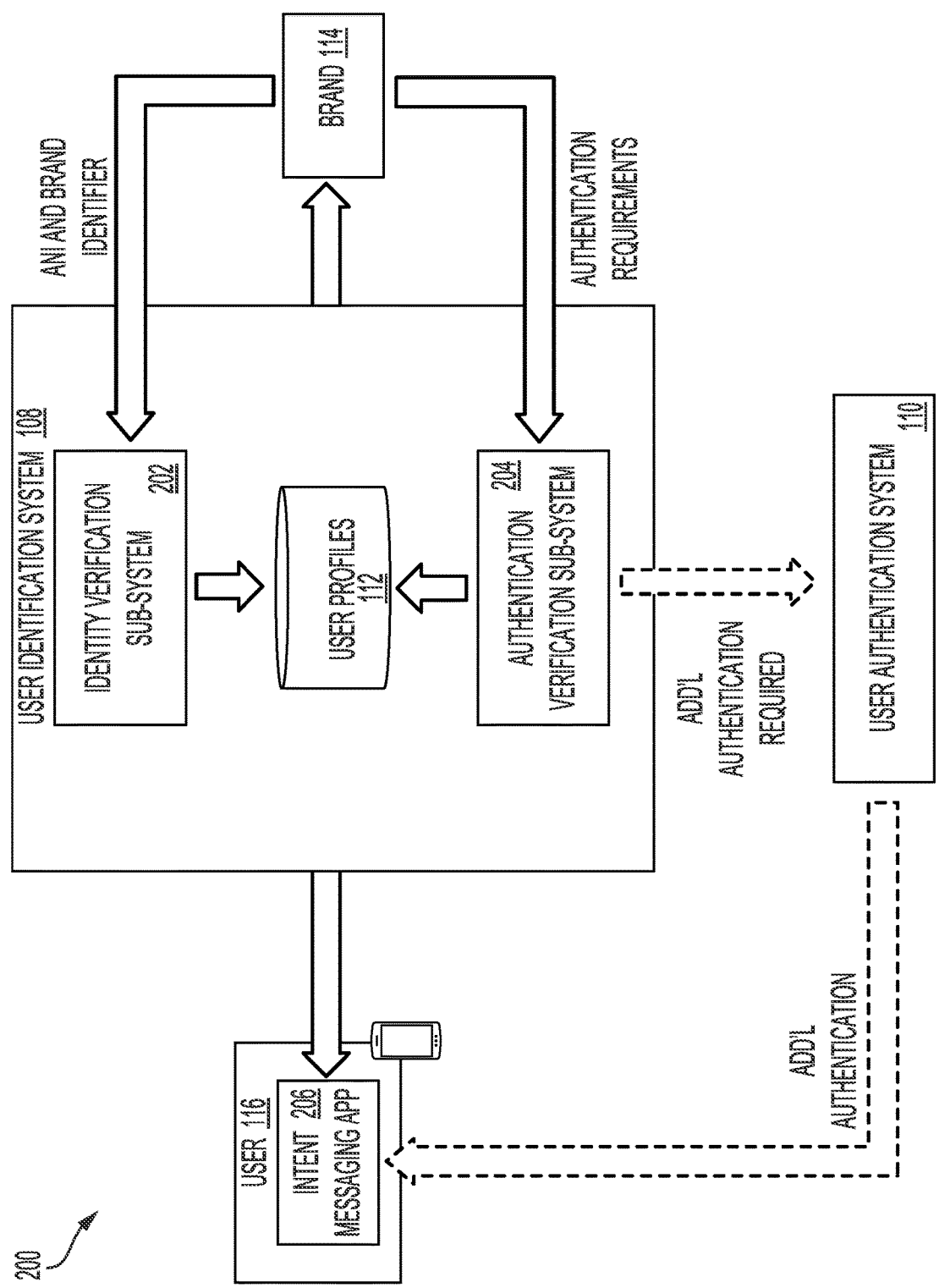
FIG. 2 shows an illustrative example of an environment in which a user identification system of an account identification and authentication service facilitates an authenticated communications session between a user and a brand based on an existing association between the user and the brand maintained by the user identification system in accordance with at least one embodiment.

FIG. 2 shows an illustrative example of an environment 200 in which a user identification system 108 of an account identification and authentication service facilitates an authenticated communications session between a user 116 and a brand 114 based on an existing association between the user 116 and the brand 114 maintained by the user identification system 108 in accordance with at least one embodiment. In the environment 200, a user 116 and a brand 114 may be engaged in a communications session to address an intent submitted by the user 116. As noted above, the communications session may include a voice call (e.g., telephone call, etc.), a video call, a text-based communication session, and the like.

During the communications session, the brand 114 may determine that verification and authentication of the user 116 is required in order to continue the communications session, such as for processing payments, discussing sensitive topics or issues, and the like. For example, if a payment is required from the user 116, the brand 114 may transmit a request to a device capability service of the brand messaging platform to identify the capabilities of the user's computing device to submit payments using rich messaging via an RCS protocol or through the intent messaging application 206 implemented on the user's computing device. In conjunction with this request, the brand 114 may further submit a request to an identity verification sub-system 202 of the user identification system 108 to verify the identity of the user 116. The identity verification sub-system 202 may be implemented using a computer system associated with the user identification system 108. In some instances, the identity verification sub-system 202 may be implemented as an application or other executable process executed on a computer system associated with the user identification system 108. As noted above, in some embodiments, the user identification system 108 is implemented on a special purpose computing system that includes various components specially tailored to perform the operations described herein. Accordingly, in such embodiments, the identity verification sub-system 202 may be implemented on hardware installed on the special purpose computing system and specially configured to perform the operations described herein.

The request submitted by the brand 114 to the identity verification sub-system 202 may include a brand identifier corresponding to the brand 114. This brand identifier may be used to determine whether the user identification system 108 has, within the user profile datastore 112, an existing record corresponding to a user-to-brand relationship (e.g., token corresponding to a user account associated with the brand 114, one or more identifiers corresponding to a user account associated with the brand 114, etc.). The identity verification sub-system 202 may, in some examples, use ANI to automatically determine a telephone number of the user 116. The identity verification sub-system 202 may use this telephone number of the user 116 to identify the user profile from the user profile datastore 112. In some instances, the identity verification sub-system 202 may obtain a user identifier corresponding to the user 116 and associated with the user profile from the device capability service, as described above.

If the identity verification sub-system 202 identifies a user profile corresponding to the user 116 within the user profile datastore 112, the identity verification sub-system 202 may transmit an acknowledgement to the brand 114 indicating that the user 116 does have an existing profile maintained by the brand messaging platform. Further, from the user profile, the identity verification sub-system 202 may provide, to the brand 114, a user identifier (e.g., a decentralized identity service user identifier, a user identifier corresponding to the user account maintained by the brand messaging platform, etc.), a known user account identifier or token for the user 116 and associated with the brand 114, the identification and authentication status of the user 116 (e.g., authentication performed by the brand messaging platform based on platform requirements, prior authentication performed according to brand authentication rules associated with the brand 114 or other brands, etc.), the level of identification and authentication performed, and the like.

The brand 114 may review the provided information to determine whether additional authentication is required in order to continue the communications session with the user 116. For example, if the user 116 has been authenticated by the brand messaging platform using biometric identification, but the brand 114 determines that the user 116 is required to additionally, or alternatively, provide government-issued credentials for authentication of the user 116, the brand 114 may define a set of brand authentication rules that specify this higher level of authentication for the user 116. The brand 114 may transmit this set of brand authentication rules to an authentication verification sub-system 204 of the user identification system 108. The authentication verification sub-system 204 may be implemented using a computer system associated with the user identification system 108. In some instances, the authentication verification sub-system 204 may be implemented as an application or other executable process executed on a computer system associated with the user identification system 108. As noted above, in some embodiments, the user identification system 108 is implemented on a special purpose computing system that includes various components specially tailored to perform the operations described herein. Accordingly, in such embodiments, the authentication verification sub-system 204 may be implemented on hardware installed on the special purpose computing system and specially configured to perform the operations described herein.

In an embodiment, the authentication verification sub-system 204 evaluates the provided brand authentication rules against the authentication status of the user 116 indicated in the user's profile within the user profile datastore 112. As noted above, the user's profile may indicate the identification and authentication status of the user 116 and the level of identification and authentication performed. The authentication verification sub-system 204 may compare this level of identification and authentication performed to the authentication requirements defined in the provided brand authentication rules to determine whether additional authentication is required. If the authentication verification sub-system 204 determines that the level of identification and authentication previously performed by the brand messaging platform is consistent with the brand authentication rules, the authentication verification sub-system 204 may indicate that the user 116 is authenticated and enables the communications session to continue in an authenticated state. For instance, the authentication verification sub-system 204 may provide an acknowledgment to the brand 114 indicating that user 116 has been successfully authenticated.

In an embodiment, if the authentication verification sub-system 204 determines, based on the brand authentication rules, that the user 116 is not authenticated according to the brand's requirements, the authentication verification sub-system 204 may determine what additional and/or alternative authentication is required of the user 116. For instance, if the authentication verification sub-system 204 determines that verification of a user's government-issued credentials is required for authentication of the user 116, the authentication verification sub-system 204 may prompt the brand 114 to determine whether to proceed with verification of the user's government-issued credentials in order to authenticate the user 116. As another illustrative, but non-limiting example, if the brand authentication rules indicate that biometric authentication is required, including facial recognition and fingerprint authentication, but the brand messaging platform has only performed facial recognition authentication, the authentication verification sub-system 204 may prompt the brand 114 to determine whether to proceed with fingerprint authentication to complete the biometric authentication required or to accept authentication of the user 116 through only facial recognition authentication.

In an embodiment, the authentication verification sub-system 204 can automatically query the user profile datastore 112 to obtain any applicable brand authentication rules as previously defined by the brand 114 and provided to the brand messaging platform. Based on the available brand authentication rules from the user profile datastore 112 and the characteristics of the communications session between the user 116 and the brand 114 (e.g., the intent being addressed, indication as to whether a payment is required, indication as to whether the communications session is sensitive in nature, etc.), the authentication verification sub-system 204 may determine whether additional authentication of the user 116 is required for the communications session. If the authentication verification sub-system 204 determines that additional authentication of the user 116 is required based on the obtained brand authentication rules, the authentication verification sub-system 204 may prompt the brand 114 to determine whether to proceed with this additional authentication of the user 116.

If the brand 114 submits a request to the authentication verification sub-system 204 to perform additional and/or authentication of the user 116, the authentication verification sub-system 204 may transmit a request to the user authentication system 110 to perform this additional and/or alternative authentication of the user 116. For example, if the user 116 has been authenticated by the brand messaging platform based on a username and password supplied by the user 116 through the intent messaging application provided by the brand messaging platform but the brand authentication rules require biometric authentication of the user 116, the authentication verification sub-system 204 may transmit a request to a user authentication system 110 to perform biometric authentication of the user 116. As another illustrative, but non-limiting example, if the brand authentication rules require authentication through verification of government-issued credentials, the authentication verification sub-system 204 may transmit a request to the user authentication system 110 to prompt the user 116 to provide information corresponding to these government-issued credentials. In response to the request from the authentication verification sub-system 204, the user authentication system 110 may transmit instructions to the intent messaging application 206 to perform the additional authentication challenges, as described above.

The user authentication system 110 may use data obtained by the intent messaging application 206 and corresponding to the user 116 to determine whether the data is valid and to authenticate the user 116. If the user authentication system 110 determines that the provided data cannot be authenticated, the user authentication system 110 may transmit a notification to the brand 114 to indicate that the user 116 could not be authenticated. If the user 116 is successfully authenticated by the user authentication system 110, the user authentication system 110 may transmit a notification to the brand to indicate that the user 116 has been authenticated. In some instances, if the additional and/or alternative authentication of the user 116 is performed by the intent messaging application 206 on behalf of the user authentication system 110, the intent messaging application 206 may directly transmit a notification to the brand 114 to indicate that the user 116 has been authenticated according to the brand authentication rules.

Figure 3:
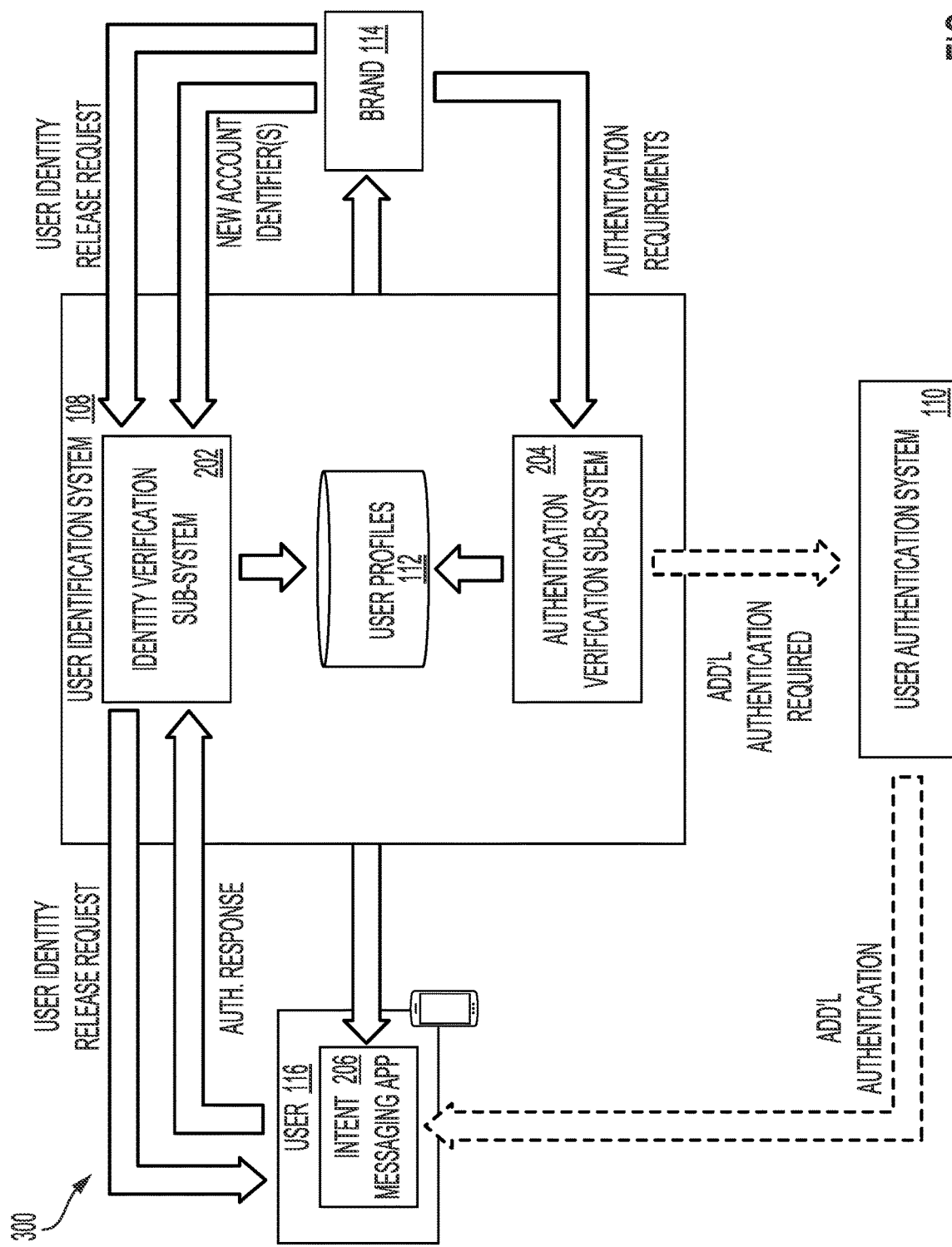
FIG. 3 shows an illustrative example of an environment in which a user identification system of an account identification and authentication service facilitates establishment of a user account associated with a brand to allow for an authenticated communications session between a user and a brand in accordance with at least one embodiment.

FIG. 3 shows an illustrative example of an environment 300 in which a user identification system 108 of an account identification and authentication service facilitates establishment of a user account associated with a brand 114 to allow for an authenticated communications session between a user 116 and a brand 114 in accordance with at least one embodiment. As noted above, at the onset of a communications session between a user 116 and a brand 114, the account identification and authentication service implemented by the brand messaging platform may not have a record of an existing relationship between the user 116 and the brand 114. For example, in response to a request from the brand 114 to verify the identity of the user 116, the identity verification sub-system 202 may determine that the user profile datastore 112 does not maintain a record corresponding to the user-to-brand relationship. However, if the user profile datastore 112 does maintain a user account associated with the brand messaging platform, the identity verification sub-system 202 may transmit an acknowledgement to the brand 114 that the user 116 is known to the brand messaging platform.

During the communications session between the user 116 and the brand 114, the user 116 and the brand 114 may confirm that a new account for the user 116 and associated with the brand 114 needs to be created in order to continue the communications session (e.g., process payments, discuss sensitive information, etc.). In response to this confirmation, the brand 114 may transmit a request to the identity verification sub-system 202 to release information from the user's account with the brand messaging platform to the brand 114 for creation of the user-to-brand relationship (e.g., the new account for the user 116 and associated with the brand 114). The identity verification sub-system 202, in response to the request from the brand 114, may transmit a set of instructions to the intent messaging application 206 implemented on the user's computing device. The set of instructions, when executed by the intent messaging application 206, may cause the intent messaging application 206 to prompt the user 116 to provide authorization for the release of the information from the user's account with the brand messaging platform to the brand 114.

If the user 116 authorizes releases of the requested information, the identity verification sub-system 202 may transmit the requested information from the user's profile in the user profile datastore 112 to the brand 114. As noted above, the brand 114 may use this information to establish the user-to-brand relationship (e.g., a new user account that is associated with the brand 114). Once the brand 114 has established the new user-to-brand relationship, the brand 114 may transmit, to the identity verification sub-system 202, user identifiers and/or tokens corresponding to the newly created user-to-brand relationship. The identity verification sub-system 202 may store the user identifiers and/or tokens in the user profile datastore 112 within the user's profile. In an embodiment, if the brand 114 has previously defined a set of brand authentication rules for communications sessions involving the brand 114, the identity verification sub-system 202 updates the user profile to associate the information corresponding to the user-to-brand relationship (e.g., user identifiers and/or tokens) with this set of brand authentication rules.

Once the new user account has been created and associated with the user's profile in the user profile datastore 112, the identity verification sub-system 202 may transmit a notification to the intent messaging application 206 to indicate that the new user account has been created. The notification may include the user identifiers and/or tokens provided by the brand 114 and associated with the new user account. In some instances, the intent messaging application 206 may associate the obtained user identifiers and/or tokens with the brand 114 such that, for future communications sessions between the user 116 and the brand 114, the intent messaging application 206 may refer to these user identifiers and/or tokens to initiate authentication and verification of the user 116 for these communications sessions.

In some examples, once the new user account has been created for the user 116, the brand 114 may determine whether additional and/or alternative authentication of the user 116 is required in order to continue with the existing communications session between the user 116 and the brand 114. For instance, as noted above, the identity verification sub-system 202 may provide the brand 114 with information corresponding to the identification and authentication status of the user 116 (e.g., authentication performed by the brand messaging platform based on platform requirements, prior authentication performed according to brand authentication rules associated with the brand 114 or other brands, etc.) and the level of identification and authentication performed. The brand 114 may review the provided information to determine whether additional authentication is required in order to continue the communications session with the user 116. If additional authentication is required, the brand 114 may transmit a request to the authentication verification sub-system 204 to perform this additional authentication. Alternatively, the brand 114 may transmit a set of brand authentication rules to the authentication verification sub-system 204, which may evaluate these rules against the authentication status of the user 116 indicated in the user's profile within the user profile datastore 112.

If the authentication verification sub-system 204 determines, based on the brand authentication rules, that the user 116 is not authenticated according to the brand's requirements, the authentication verification sub-system 204 may determine what additional and/or alternative authentication is required of the user 116. The authentication verification sub-system 204 may prompt the brand 114 to determine whether to proceed with the identified additional and/or alternative authentication challenges required to authenticate the user 116 according to the brand authentication rules. If the brand 114 submits a response to proceed with the identified additional and/or alternative authentication challenges (or otherwise submits a request to perform these additional and/or alternative authentication challenges), the authentication verification sub-system 204 may transmit a request to the user authentication system 110 to perform this additional and/or alternative authentication of the user 116. The user authentication system 110 may transmit instructions to the intent messaging application 206 to perform the additional authentication challenges, as described above. Further, the user authentication system 110 may use data obtained by the intent messaging application 206 and corresponding to the user 116 to determine whether the data is valid and to authenticate the user 116 according to the brand authentication rules.

Figure 4:
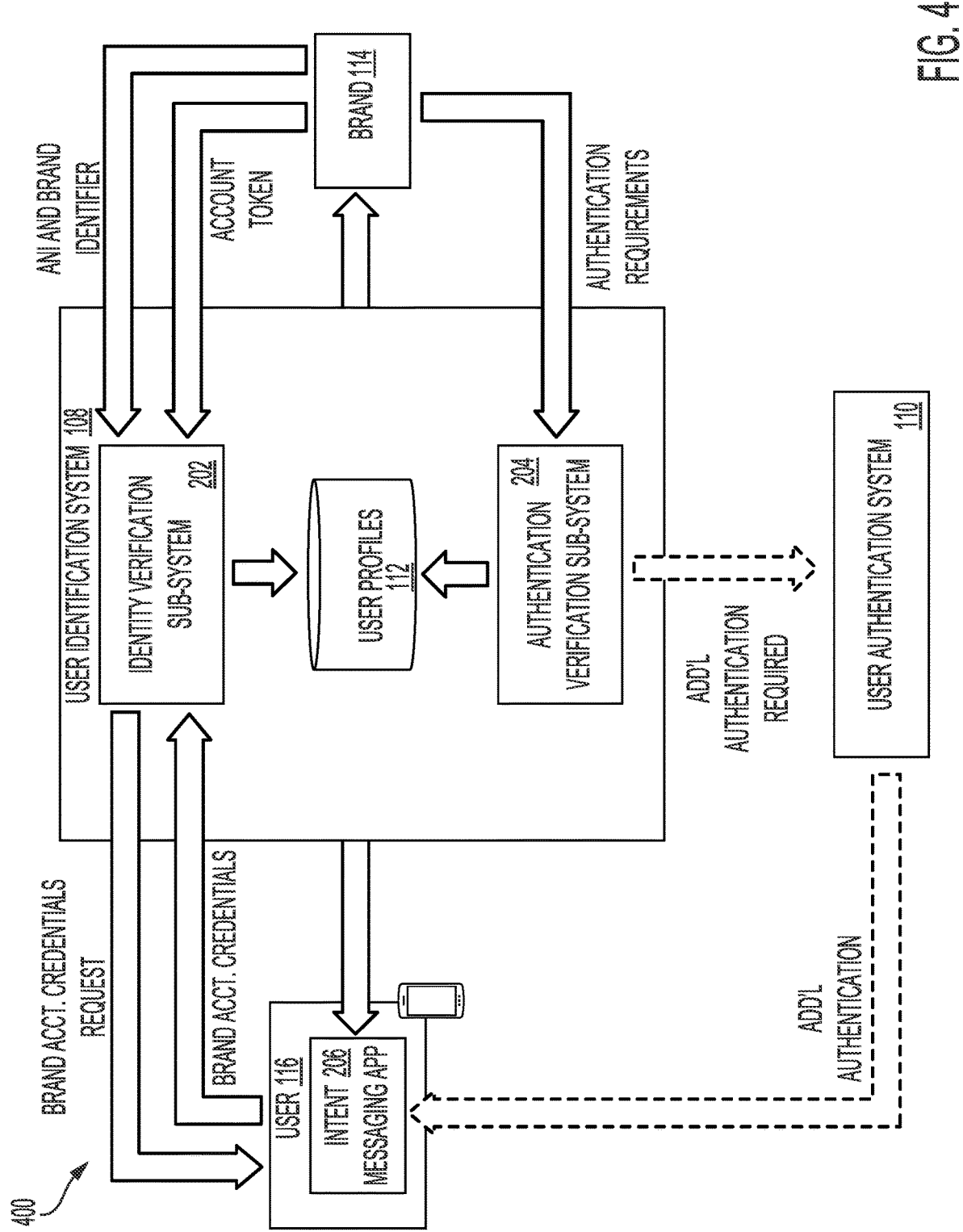
FIG. 4 shows an illustrative example of an environment in which a user identification system of an account identification and authentication service validates a set of credentials corresponding to a user account associated with a brand to record an existing association between the user and the brand to allow for an authenticated communications session between a user and a brand in accordance with at least one embodiment.

FIG. 4 shows an illustrative example of an environment 400 in which a user identification system 108 of an account identification and authentication service validates a set of credentials corresponding to a user account associated with a brand 114 to record an existing association between a user 116 and the brand 114 to allow for an authenticated communications session between the user 116 and the brand 114 in accordance with at least one embodiment. As noted above, in some instances, the user 116 may have an existing relationship with the brand 114 (e.g., an existing user account associated with the brand 114, etc.) that the account identification and authentication system does not have a record of. Thus, in response to a request from the brand 114 to the identity verification sub-system 202 of the user identification system 108 to verify the identity of the user 116, the identification verification sub-system 202 may indicate that there is no record of the relationship between the user 116 and the brand 114. For example, in response to this request from the brand 114 to verify the identity of the user 116, the identity verification sub-system 202 may determine that the user profile datastore 112 does not maintain a record corresponding to the user-to-brand relationship. However, if the user profile datastore 112 does maintain a user account associated with the brand messaging platform, the identity verification sub-system 202 may transmit an acknowledgement to the brand 114 that the user 116 is known to the brand messaging platform.

In an embodiment, if the brand 114 indicates, in its request to the identity verification sub-system 202, that the brand 114 does have an existing relationship with the user 116, but the identity verification sub-system 202 determines that the user profile datastore 112 does maintain a record of this relationship, the identity verification sub-system 202 transmits a request to user 116 (such as through the intent messaging application 206) to provide their user account credentials corresponding to the existing relationship. For example, in its request to the identity verification sub-system 202, the brand 114 may provide a brand identifier corresponding to the brand 114 and an identifier corresponding to an existing user account associated with the user 116. If the identity verification sub-system 202 determines that the user profile maintained in the user profile datastore 112 and associated with the user 116 does not specify the identifier corresponding to the existing user account associated with the user 116, the identity verification sub-system 202 may determine that it does not have a record of the existing relationship between the brand 114 and the user 116. This may cause the identity verification sub-system 202 to transmit a request to user 116 to provide their user account credentials associated with the account specified by the brand 114.

In response to receiving the request from the identity verification sub-system 202, the intent messaging application 206 may prompt the user 116 (such as through a graphical user interface (GUI) presented through the user's computing device) to provide their credentials corresponding to the user account. The intent messaging application 206, in some instances, may present, to the user 116, information that may be used to indicate the user account for which the credentials are being requested (e.g., a username associated with the user 116 and provided by the brand 114, as well as other information that may uniquely identify the brand 114 (e.g., logos, trademarks, identifiers, etc.). In some instances, the intent messaging application 206 may indicate that the brand 114 has been authenticated by the brand messaging platform. This indication may serve to provide reassurance that the request for the user's credentials originated from the brand 114 and not a different entity (e.g., an entity impersonating the brand 114, a third-party entity, another brand, etc.). If the user 116 opts to not provide their user account credentials, the identity verification sub-system 202 may transmit a notification to the brand 114 to indicate that the user 116 could not be authenticated. This may cause the brand 114 to terminate the communications session with the user 116.

If the user 116 submits their user account credentials through the intent messaging application 206, the identity verification sub-system 202 may determine whether the provided user account credentials are valid. For instance, the identity verification sub-system 202 may transmit the provided user account credentials to an authentication server associated with the brand 114 (e.g., an OAuth server, etc.) for user authentication. If the user credentials are valid, the authentication server associated with the brand 114 may return a token corresponding to the user account associated with the brand 114. In response to obtaining this token from the authentication server, the identity verification sub-system 202 may transmit the token to the brand 114 to verify that the token is associated with the user account. If so, the identity verification sub-system 202 may persist the token, along with the provided user account credentials and other information corresponding to the relationship between the user 116 and the brand 114 (e.g., username, telephone number of the user 116, brand identifier, etc.) within the user profile associated with the user 116 and stored within the user profile datastore 112.

Once the user-to-brand relationship has been verified by the identity verification sub-system 202, the identity verification sub-system 202 may transmit a notification to the brand 114 indicating this verification of the relationship. In some instances, the brand 114 may determine whether additional and/or alternative authentication of the user 116 is required in order to continue with the existing communications session between the user 116 and the brand 114. For example, as noted above, the identity verification sub-system 202 may provide the brand 114 with information corresponding to the identification and authentication status of the user 116 and the level of identification and authentication performed. The brand 114 may review the provided information to determine whether additional authentication is required for the communications session with the user 116. If additional authentication is required, the brand 114 may transmit a request to the authentication verification sub-system 204 to perform this additional authentication. Alternatively, the brand 114 may transmit a set of brand authentication rules to the authentication verification sub-system 204, which may evaluate these rules against the authentication status of the user 116 indicated in the user's profile within the user profile datastore 112.

Similar to the processes described above in connection with FIGS. 2-4, if the authentication verification sub-system 204 determines, based on the brand authentication rules, that the user 116 is not authenticated according to the brand's requirements, the authentication verification sub-system 204 may determine what additional and/or alternative authentication is required of the user 116. If the authentication verification sub-system 204 determines, based on these brand authentication rules, that additional and/or alternative authentication may be required, the authentication verification sub-system 204 may prompt the brand 114 to determine whether to proceed with the additional and/or alternative authentication challenges. If the brand 114 submits a response to proceed with the additional and/or alternative authentication challenges (or otherwise submits a request to perform these additional and/or alternative authentication challenges), the authentication verification sub-system 204 may transmit a request to the user authentication system 110 to perform these additional and/or alternative authentication challenges. The user authentication system 110 may transmit instructions to the intent messaging application 206 to perform the additional authentication challenges. Further, the user authentication system 110 may use data obtained by the intent messaging application 206 to determine whether the data is valid and to authenticate the user 116 according to the brand authentication rules.

As noted above, the brand messaging platform may implement an automated voice agent that facilitates the communications session between the user 116 and the brand 114. The intent submitted by the user 116 may be used by the automated voice agent to determine that user identification and authentication are required in order to facilitate the communications session between the user 116 and the brand 114. The automated voice agent may utilize the machine learning algorithm described above to determine whether user identification and authentication are required for the communications session. If the automated voice agent determines that user identification and authentication are required for the communications session, the automated voice agent, through the intent messaging application, may prompt the user 116 to provide their user account credentials corresponding to the user account associated with the brand 114. If the user 116 provides their user account credentials, the identity verification sub-system 202 may validate these credentials against the authentication server associated with the brand 114, as described above. Once the user 116 has been authenticated, the identity verification sub-system 202 may prompt the user 116 to retain a set of tokenized account identifiers that may be used for future interactions with the brand 114 through the brand messaging platform 102. The identity verification sub-system 202 may also retain these tokenized account identifiers within the user profile datastore 112 within the user's profile.

FIG. 5 shows an illustrative example of an environment 500 in which a conversation machine learning system 502 is implemented to dynamically predict identification and authentication requirements for an ongoing communications session between a user 116 and a brand 114 in accordance with at least one embodiment. In the environment 500, the account identification and authentication service 106 implements a conversation machine learning system 502, which may monitor, in real-time, communications sessions between users and brands facilitated by the brand messaging platform. The conversation machine learning system 502 may be implemented on a computing system or other system (e.g., server, etc.) of the account identification and authentication service 106. Alternatively, the conversation machine learning system 502 may be implemented as an application or other executable process on a computer system implemented by the account identification and authentication service 106.

As illustrated in FIG. 5, the conversation machine learning system 502 may comprise an identification and authentication prediction model 504 that may automatically, and in real-time, process communications exchanged between a user 116 and a brand 114 over a communications session to predict the level of identification and authentication required for the communications session. The identification and authentication prediction model 504 may be trained using supervised learning techniques. For instance, a dataset of input messages and/or communications associated with different communications sessions (including simulated and/or actual communications sessions) and corresponding identification and authentication requirements can be selected for training of the identification and authentication prediction model 504. In some examples, the input messages and/or communications can be obtained from administrators of the brand messaging platform, a repository of previous communications sessions between users and brands maintained of the brand messaging platform, or other sources associated with the brand messaging platform. For instance, the input messages and/or communications may be obtained from the user profile datastore 112, which may store messages exchanged between users and brands during corresponding communications sessions, as well as the identification and authentication processes performed for these communications sessions.

In some implementations, identification and authentication requirements used to train the identification and authentication prediction model 504 may include requirements provided by the brands engaged in the sample communications sessions or by other entities associated with simulated communications sessions used for training of the identification and authentication prediction model 504. The identification and authentication prediction model 504 may be evaluated to determine, based on the input sample messages and/or communications corresponding to communications sessions supplied to the identification and authentication prediction model 504, whether the identification and authentication prediction model 504 is accurately predicting the level of identification and authentication for each of the sample communications sessions. Based on this evaluation, the identification and authentication prediction model 504 may be modified (e.g., one or more parameters or variables may be updated) to increase the likelihood of the identification and authentication prediction model 504 in accurately predicting the identification and authentication requirements for an active communications session.

In an embodiment, the identification and authentication prediction model 504 can automatically, and in real-time, transmit identification and/or authentication requests to the user 116 during a communications session based on the communications exchanged between the user 116 and the brand 114. For example, as the identification and authentication prediction model 504 processes, in real-time, the communications exchanged between a user 116 and a brand 114, the identification and authentication prediction model 504 may determine whether additional and/or alternative identification and/or authentication challenges are required for the communications session. As an illustrative example, if the user 116 and the brand 114 are engaged in a communications session, and the communications exchanged during the communications session veer towards sensitive subjects for which additional user authentication may be expected, the identification and authentication prediction model 504 may automatically predict what level of user authentication may be required to allow for discussion of sensitive subjects between the user 116 and the brand 114. Accordingly, the identification and authentication prediction model 504 may output a predicted level of identification and authentication for the communications session. The identification and authentication prediction model 504 may further compare this predicted level of identification and authentication against the brand authentication rules defined in the user profile datastore 112 for the brand 114. If the predicted level of identification and authentication is more stringent than that defined in the brand authentication rules, the identification and authentication prediction model 504 may automatically submit an identification and/or authentication request to the user 116 to obtain data that may be used to verify the identity of the user 116 and to determine the authentication status of the user 116 according to the predicted level of identification and authentication required for the communications session. This may allow the conversation machine learning system 502 to anticipate the identification and authentication requirements for the communications session such that, in response to a brand request to identify and authenticate the user 116 for the communications session, the user identification system 108 may indicate that the user 116 has been identified and authenticated according to the predicted level of identification and authentication. The brand 114 may determine whether this predicted level of identification and authentication satisfies its request or whether additional and/or alternative identification and authentication challenges are required.

In some instances, rather than performing the additional and/or alternative identification and authentication challenges, the identification and authentication prediction model 504 may continuously, and in real-time, provide its predictions to the user identification system 108. The user identification system 108 may continuously evaluate the level of identification and authentication predicted by the identification and authentication prediction model 504 to determine whether additional identification and authentication of the user 116 is required for the communications session. For instance, if the user identification system 108 maintains, in the user profile datastore 112, a set of brand authentication rules provided by the brand 114, the user identification system 108 may evaluate the set of brand authentication rules against the predicted level of identification and authentication for the communications session between the brand 114 and the user 116 to determine whether the predicted level of identification and authentication is more stringent than that defined in the brand authentication rules. If so, the user identification system 108, through the user authentication system 110, may transmit additional and/or alternative identification and authentication challenges to the user 116 in order to meet the predicted level of identification and authentication required for the communications session.

In some instances, the user identification system 108 or the identification and authentication prediction model 504 may transmit a notification to the brand 114 with regard to the predicted level of identification and authentication identified by the identification and authentication prediction model 504. This may allow the brand 114 to determine whether to submit a request to the user identification system 108 to perform additional identification and authentication of the user 116 in order to allow for the communications session with the user 116 to continue. If the brand 114 determines that the predicted level of identification and authentication is accurate for the communications session, the user identification system 108 may update the brand authentication rules to incorporate the predicted level of identification and authentication into the rules.

In an embodiment, the response from the brand 114 and the user identification system 108 with regard to the predicted level of identification and authentication can be used as feedback to further train the identification and authentication prediction model 504. For example, if the brand 114 rejects the predicted level of identification and authentication identified by the identification and authentication prediction model 504 (e.g., the current level of identification and authentication for the user 116 is acceptable), the identification and authentication prediction model 504 may be re-trained to reduce the likelihood of similar predictions being provided for similar communications sessions and/or for similar users and brands. Alternatively, if the brand 114 accepts the predicted level of identification and authentication (e.g., the brand 114 submits a request to perform additional user identification and authentication according to the predicted level), the identification and authentication prediction model 504 may be reinforced to maintain or increase the likelihood of similar predictions being provided for similar communications sessions and/or for similar users and brands.

FIG. 6 shows an illustrative example of an environment in which an identification and authentication prediction model processes communications between users and brands during communications sessions to predict identification and authentication requirements for the communications sessions in accordance with at least one embodiment. In the environment 600, as illustrated in FIG. 6, the identification and authentication prediction model 504, at step 602, may obtain conversation data as this data is exchanged between the user 116 and the brand 114 over a communications session. The conversation data may include messages exchanged in real-time between the user 116 and the brand 114 during the communications session. These messages may include text-based messages, voice messages, video messages, and the like. In some instances, the identification and authentication prediction model 504 may process, in real-time, a feed or stream associated with the communications session through which communications (such as video communications, voice communications) are exchanged between the user 116 and the brand 114. Thus, the identification and authentication prediction model 504 may automatically, and in real-time, capture conversation data associated with the communications session as the conversation data is exchanged.

At step 604, the identification and authentication prediction model 504 may predict the level of identification and authentication required of the user 116 for the communications session. As noted above, as messages or communications are exchanged between a user 116 and a brand 114 during a communications session, the identification and authentication prediction model 504 may, in real-time, continuously process these messages or communications to predict the level of identification and authentication that may be required from the user 116 for the communications session. For instance, if a new message is exchanged between the user 116 and the brand 114 over the communications session, the identification and authentication prediction model 504 may automatically, and in real-time, process this new message and any previous messages exchanged during the communications session to predict the level of identification and authentication required of the user 116 for the communications session. As another illustrative, but non-limiting example, if the communications session is one in which real-time communications between the user 116 and the brand 114 are exchanged (e.g., a video call, a voice call, etc.), the identification and authentication prediction model 504 may continuously, and in real-time, process a feed corresponding to the communications session such that a predicted level of identification and authentication required from the user 116 is dynamically determined and updated in real-time as these real-time communications are exchanged.

At step 606, the identification and authentication prediction model 504 may transmit one or more identification and authentication requests to the user 116 to obtain identification and/or authentication data that may be used to identify and authenticate the user according to the predicted level of identification and authentication determined by the identification and authentication prediction model 504. For example, as the identification and authentication prediction model 504 processes, in real-time, the communications exchanged between a user 116 and a brand 114, the identification and authentication prediction model 504 may determine whether additional and/or alternative identification and/or authentication challenges are required for the communications session. For instance, the identification and authentication prediction model 504 may compare the predicted level of identification and authentication to the current level of identification and authentication for the user 116 (such as through evaluation of brand authentication rules, data within a user profile from the user profile datastore that indicates the user's current status and level of identification and authentication performed, and the like). If the identification and authentication prediction model 504 determines that the predicted level of identification and authentication is more stringent than the current level of identification and authentication for the user 116, the identification and authentication prediction model 504 may automatically generate one or more identification and authentication requests that may be transmitted to the user 116 to obtain identification and/or authentication data according to the predicted level of identification and authentication required for the communications session.

Referring to an example described above, if the user 116 and the brand 114 are engaged in a communications session, and the communications exchanged during the communications session veer towards sensitive subjects for which additional user authentication may be expected, the identification and authentication prediction model 504 may automatically predict what level of user authentication may be required to allow for discussion of sensitive subjects between the user 116 and the brand 114. The identification and authentication prediction model 504 may compare this predicted level of identification and authentication against the brand authentication rules defined in the user profile datastore for the brand 114. If the predicted level of identification and authentication is more stringent than that defined in the brand authentication rules, the identification and authentication prediction model 504 may automatically transmit an identification and/or authentication request to the user 116 to obtain data that may be used to verify the identity of the user 116 and to determine the authentication status of the user 116 according to the predicted level of identification and authentication.

At step 608, the identification and authentication prediction model 504 may provide the obtained identification and/or authentication data to the user authentication system 110. As noted above, the user authentication system 110 may process this data for verification and authentication of the user 116 according to the predicted level of identification and authentication identified by the identification and authentication prediction model 504. For example, if the intent messaging application implemented on the user's computing device obtains data corresponding to a user's government-issued credentials, the user authentication system 110 may evaluate this data to determine whether it is valid. In some instances, the user authentication system 110 may query a decentralized identity service or other identity service associated with the government-issued credentials to verify the authenticity of the provided data and to determine whether the data corresponds to the user 116. If the user authentication system 110 determines that the provided data cannot be authenticated (e.g., the data is invalid, the data does not correspond to the user 116, the data cannot be corroborated by the identity service, etc.), the user authentication system 110 may update the user's profile within the user profile datastore to indicate that the user 116 could not be authenticated for the predicted level of identification and authentication identified by the identification and authentication prediction model 504. In some examples, if authentication is performed on behalf of the user authentication system 110 via the intent messaging application, and the intent messaging application determines that the user 116 cannot be authenticated, the intent messaging application may update the user's profile within the user profile datastore to indicate that the user 116 could not be authenticated for the predicted level of identification and authentication.

In an embodiment, the results corresponding to the identification and authentication challenges provided to the user 116 based on the predicted level of identification and authentication identified by the identification and authentication prediction model 504 for the communications session can be provided to the brand 114. For example, the user authentication system 108 may transmit a notification to the brand 114 with regard to the predicted level of identification and authentication identified by the identification and authentication prediction model 504. Further, the user authentication system 108 may provide the results corresponding to the identification and authentication challenges provided to the user 116 through the user authentication system 110. This may allow the brand 114 to determine the current level of identification of authentication for the user 116 (according to the predicted level of identification and authentication) and determine whether to submit a request to the user identification system 108 to perform additional identification and authentication of the user 116. If the brand 114 determines that the predicted level of identification and authentication is accurate for the communications session, the user identification system 108 may update the brand authentication rules to incorporate the predicted level of identification and authentication into the rules. Alternatively, if the brand 114 determines that the predicted level of identification and authentication is insufficient for the present communications session, the user identification system 108 may update the user profile associated with the communications session to indicate that the predicted level of identification and authentication determined by the identification and authentication prediction model 504 was not accurate.

In some instances, if the brand 114 submits a request to the user identification system 108 to perform additional and/or alternative identification and authentication in order to successfully authenticate the user 116 for the communications session, the user identification system 108 may determine what identification and authentication challenges may be required in order to authenticate the user 116 according to the brand's requirements. The user identification system 108 may transmit a request to the user authentication system 110 to perform these identification and authentication challenges and to determine whether the user 116 can be authenticated based on responses to these identification and authentication challenges. In an embodiment, the user identification system 108 can further provide, to the identification and authentication prediction model 504, the additional and/or alternative identification and authentication challenges being performed in response to the brand's request. This may serve as feedback with regard to the determination of the predicted level of identification and authentication required for the communications session performed by the identification and authentication prediction model 504. Thus, at step 610, the identification and authentication prediction model 504 may obtain these additional and/or alternative identification and authentication challenges being performed for the communications session.

As noted above, the response from the brand 114 with regard to the predicted level of identification and authentication can be used as feedback to further train the identification and authentication prediction model 504. For example, if the brand 114 rejects the predicted level of identification and authentication identified by the identification and authentication prediction model 504 (e.g., the current level of identification and authentication for the user 116 is acceptable, the brand 114 submits a request to perform additional and/or alternative identification and authentication challenges, etc.), the identification and authentication prediction model 504, at step 612, may be re-trained to reduce the likelihood of similar predictions being provided for similar communications sessions and/or for similar users and brands. Alternatively, if the brand 114 accepts the predicted level of identification and authentication (e.g., the brand 114 accepts the results provided by the user identification system 108 according to the predicted level of identification and authentication, the brand 114 submits a request to perform additional user identification and authentication according to the predicted level, etc.), the identification and authentication prediction model 504 may be reinforced to maintain or increase the likelihood of similar predictions being provided for similar communications sessions and/or for similar users and brands.

It should be noted that the identification and authentication prediction model 504 may automatically, and in real-time, generate and provide the predicted levels of identification and authentication for myriad communications sessions that may be occurring at the same time amongst different users and brands. For example, the identification and authentication prediction model 504, at step 602, may simultaneously, and in real-time, obtain conversation data corresponding to myriad communications sessions between different users and different brands as communications are exchanged amongst these different users and brands. Thus, the identification and authentication prediction model 504 may be implemented to continuously, and in real-time, process communications corresponding to multiple and distinct communications sessions at the same time.

The identification and authentication prediction model 504 may perform the aforementioned steps 604-610 for simultaneous communications sessions between different users and brands in order to predict the level of identification and authentication required for each of these communications sessions and to obtain any additional and/or alternative identification and authentication challenges being performed for the simultaneous communications sessions. The responses from the various brands engaged in these communications sessions and with regard to the predicted levels of identification and authentication can be used as feedback to further train the identification and authentication prediction model 504. For example, if a brand rejects a predicted level of identification and authentication for a particular communications session and another brand accepts a different predicted level of identification and authentication for its communications session, the identification and authentication prediction model 504, at step 612, may be re-trained according to the feedback provided by these different brands in order to increase the likelihood of the identification and authentication prediction model 504 providing accurate predictions for similar communications sessions and/or for similar users and brands. Thus, the identification and authentication prediction model 504 may be dynamically updated in real-time based on feedback corresponding to the myriad communications sessions facilitated by the brand messaging platform. This allows for the identification and authentication prediction model 504 to process any number of simultaneous communications sessions between different users and brands and to provide tailored predictions with regard to the levels of identification and authentication that may be required for each of these communications sessions.

Figure 7A:
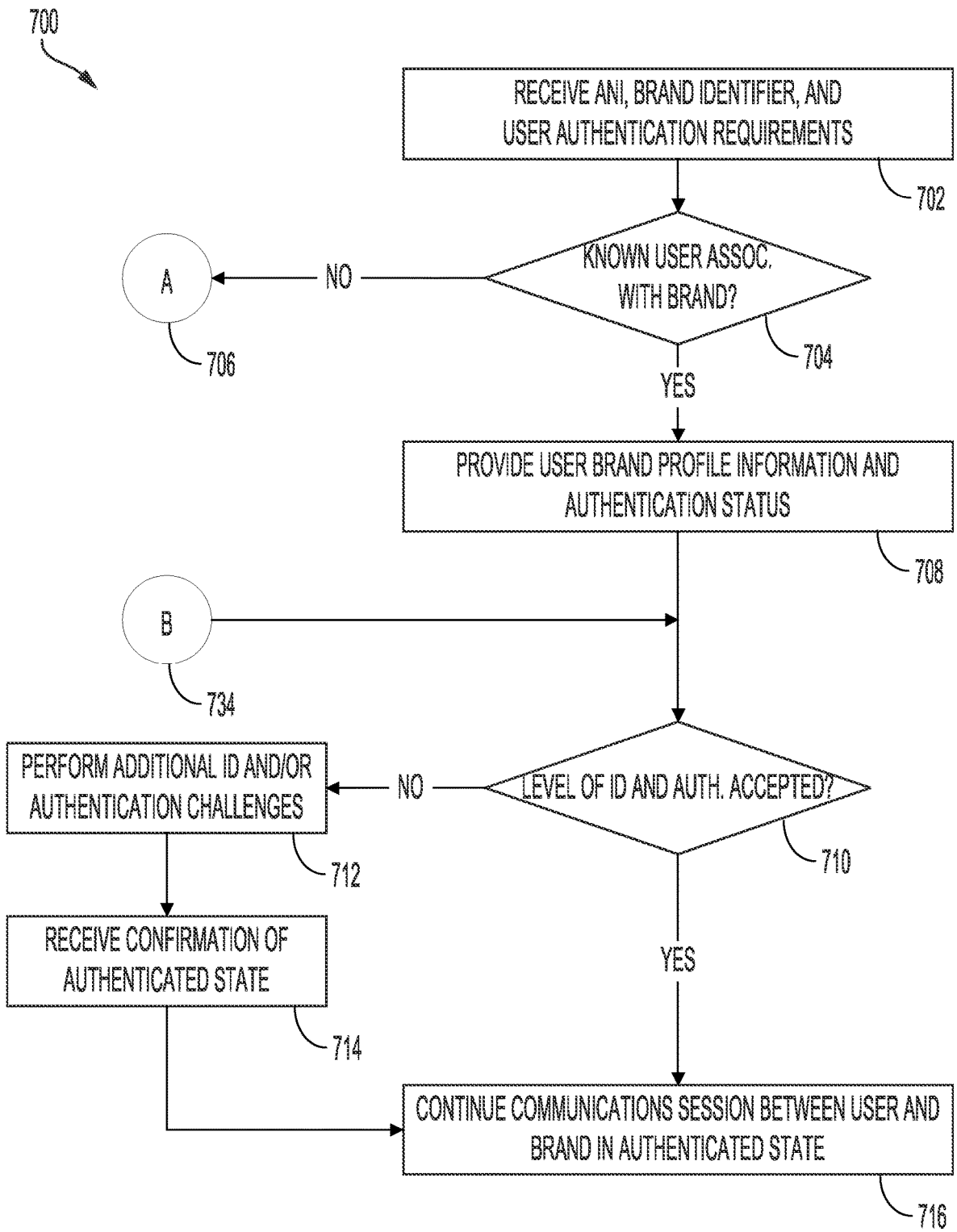
FIGS. 7A-7C show an illustrative example of a process for synchronizing user identity and authentication between a user and a brand during a communications session in accordance with at least one embodiment.
Figure 7B:
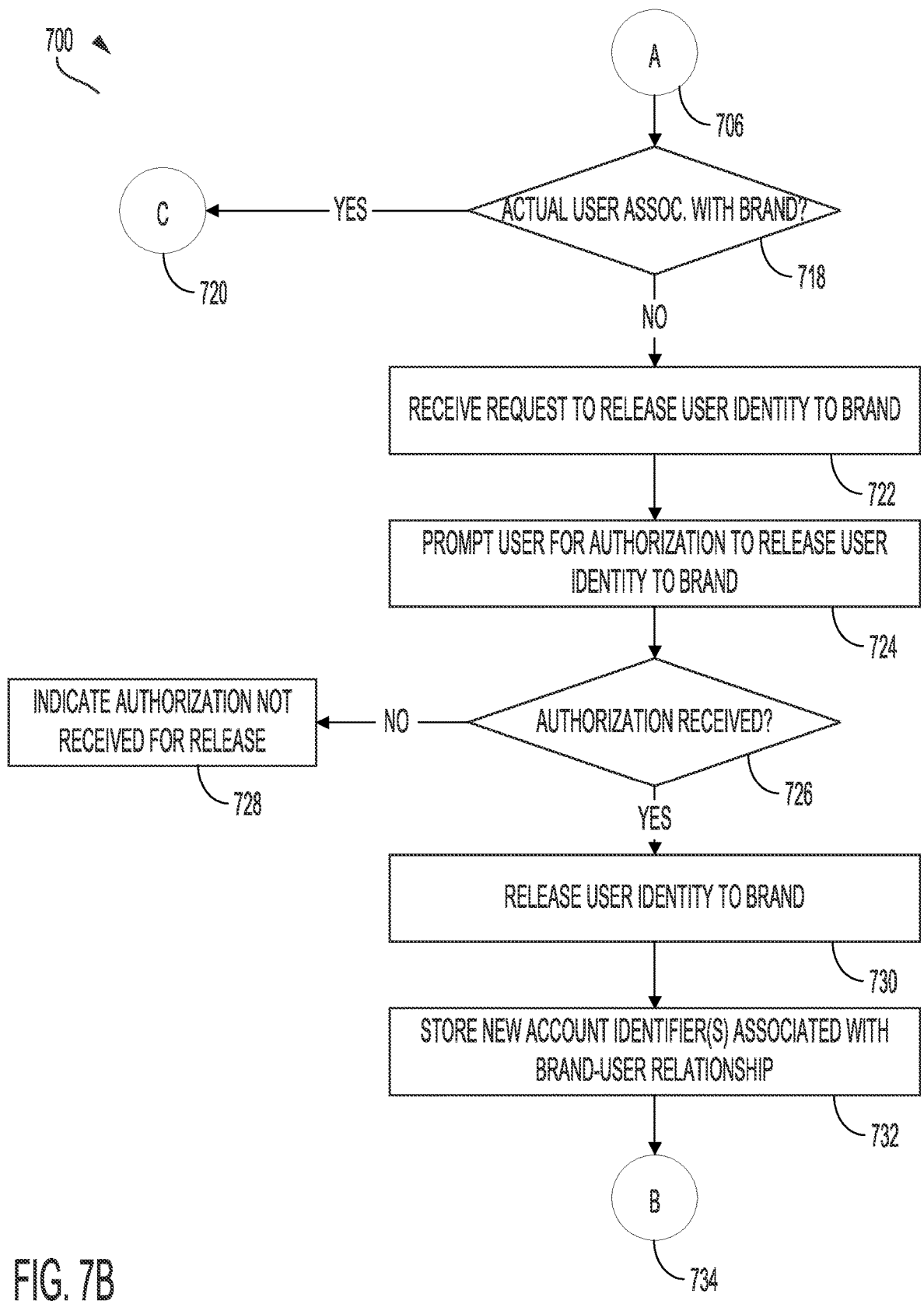
Figure 7C:
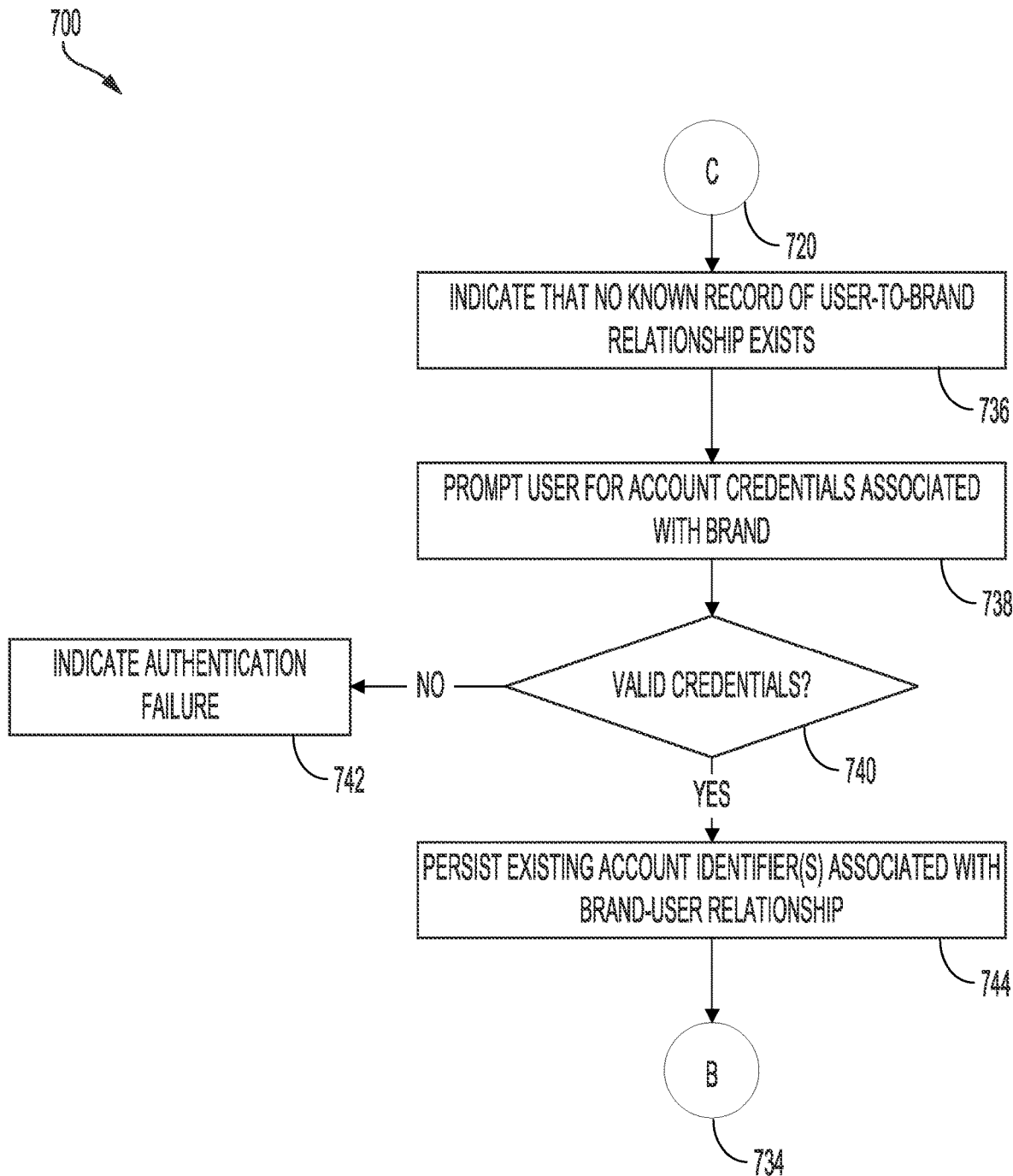

FIGS. 7A-7C show an illustrative example of a process 700 for synchronizing user identity and authentication between a user and a brand during a communications session in accordance with at least one embodiment. The process 700 may be performed by the account identification and authentication service implemented by the brand messaging platform. As noted above, the account identification and authentication service may include a user identification system that is implemented to verify the identity of a user according to the authentication methods implemented by the brand messaging platform and to provide brands with identifying information corresponding to the users interacting with these brands. Further, the account identification and authentication service may include a user authentication system 110 that is implemented to execute any required authentication challenges and to provide responses to brands regarding the authentication of users. In some instances, various operations associated with the process 700 may be performed using a machine learning algorithm, such as the identification and authentication prediction model implemented via the conversation machine learning system described above in connection with FIGS. 5 and 6.

At step 702, the user identification system of the account identification and authentication service may receive an ANI, brand identifier, and user authentication requirements from a brand (e.g., an end agent associated with the brand, a bot associated with the brand, etc.). As noted above, a brand may submit a request to the user identification system to verify the identity of a user engaged in a communications session with the brand and to authenticate the user according to the authentication requirements of the brand. The user identification system may maintain a user profile datastore that stores thereon a user profile for each user of the brand messaging platform. A user profile may indicate a user identifier corresponding to a user account associated with the brand messaging platform, user identifiers and/or tokens corresponding to user accounts associated with different brands, a corresponding user's authentication status with regard to authentication performed by the brand messaging platform, the type or level of authentication performed by the brand messaging platform, and the like. The user profile datastore may further include a set of brand authentication rules associated with the brand. These rules may define the level of identification and authentication required for the brand to deem a user to be authenticated for the communications session between the user and the brand. In some instances, the set of brand authentication rules can be provided by the brand in its request to the user identification system to verify the identity of the user and to authenticate the user according to the authentication requirements of the brand.

At step 704, the user identification system may determine whether it maintains a known user association with the brand (e.g., an existing user-to-brand relationship, a user account for the user that is associated with the brand, etc.). For instance, the user identification system may query the user profile datastore to identify a user profile associated with the user indicated by the brand or otherwise identified based on the ongoing communications session between the user and the brand. The user identification system may use the brand identifier provided by the brand in its request to determine whether the user profile has an existing record corresponding to a user-to-brand relationship (e.g., token corresponding to a user account associated with the brand, one or more identifiers corresponding to a user account associated with the brand, etc.). As noted above, the user identification system can use ANI to automatically determine a telephone number of the user. The user identification system can use the telephone number of the user to identify the user profile from the user profile datastore. In some instances, the user identification system may obtain a user identifier corresponding to the user and associated with the user profile from a device capability service, which is implemented to determine the capabilities of the user's computing device to provide payments over a communications protocol, such as an RCS protocol described above.

If the user identification system determines that the user profile indicates an existing user-to-brand relationship, the user identification system may provide, at step 708, an acknowledgement to the brand that includes information corresponding to the user profile from the user profile datastore. For instance, the user identification system may provide the brand with a user identifier, a known user account identifier or token for the user and associated with the brand, the identification and authentication status of the user, the level of identification and authentication performed, and the like. This information may allow the brand to determine whether additional identification and authentication of the user 116 is required in order to continue the communications session. Accordingly, at step 710, the user identification system may determine whether the level of identification and authentication has been accepted by the brand.

If the user identification system determines that the level of identification and authentication has not been accepted by the brand (e.g., the brand has indicated that additional and/or alternative authentication of the user is required, etc.), the user identification system, at step 712, may perform additional and/or alternative identification and/or authentication challenges in order to properly authenticate the user according to the brand's requirements. For instance, if the brand submits a request to the user identification system to perform additional user identification and authentication in order to successfully authenticate the user, the user identification system may determine what authentication challenges may be required in order to authenticate the user according to the brand's requirements. The user identification system may transmit a request to the user authentication system, as described above, to perform the additional and/or alternative identification and/or authentication challenges required to authenticate the user according to the brand's requirements.

As noted above, the user authentication system may transmit instructions to the intent messaging application implemented on the user's computing device in order to perform the additional and/or alternative identification and/or authentication challenges. The results of these additional and/or alternative challenges may be provided to the user authentication system, which may, in turn, provide the results to the brand. In some examples, data corresponding to the user's response to these challenges may be provided to the user authentication system for verification and authentication. The user authentication system may evaluate this data to determine whether it is valid. In some instances, the user authentication system may query a decentralized identity service or other identity service associated with the provided data to verify the authenticity of the provided data and to determine whether the data corresponds to the user. If the user is successfully authenticated by the user authentication system (either through verification of data provided by the user through an identity service or through verification performed by the intent messaging application), the user authentication system may transmit a notification to the brand to indicate that the user has been authenticated.

The user identification system, at step 714, may receive confirmation of the user's authenticated state. Accordingly, at step 716, the user identification system may continue the communications session between the user and the brand in this authenticated state. The user identification system may transmit a notification to the brand to indicate that the communications session is in an authenticated state. In some instances, if the user and the brand utilize respective interfaces (e.g., graphical user interfaces) to participate in the communications session, the user identification system may update these respective interfaces to indicate that the user has been authenticated according to the brand's requirements. This may allow the user and the brand (e.g., an end agent) to readily determine the authentication state of the communications session.

Returning to step 704, whereby the user identification system may determine whether it maintains a known user association with the brand, if the user identification system determines that there is no known user association with the brand (e.g., there is no record of an existing relationship between the brand and the user, etc.), the user identification system may proceed through step 706 to determine, at step 718, whether the brand has indicated an actual user association with the brand. For instance, in its request to the user identification system, the brand may indicate (such as through an account identifier corresponding to a user account maintained by the brand, etc.) whether it has an existing relationship with the user. If the brand does not provide an indication of an existing relationship with the user, the user identification system may determine that there is no actual association between the user and the brand. However, if the brand provides some indication of an existing relationship with the user (e.g., an account identifier, a username associated with the user, an acknowledgement that the brand has a relationship with the user, etc.), the user identification system may determine that there is an actual user association with the brand.

If the user identification system determines that there is no actual user association with the brand, the user identification system, but does maintain, for the user, a user account associated with the brand messaging platform, the user identification system may transmit an acknowledgement to the brand that the user is known to the brand messaging platform. As noted above, in response to the acknowledgement from the user identification system, the brand may transmit a request to the user identification system to release information from the user account to the brand for creation of a user-to-brand relationship (e.g., a new user account for the user and that is associated with the brand, etc.). Accordingly, at step 722, the user identification system may receive a request from the brand to release the user's identity to the brand.

In response to the request, the user identification system, at step 724, may transmit instructions to the intent messaging application used by the user to access the brand messaging platform to prompt the user to authorize release of the information from the user account to the brand. The intent messaging application may obtain a response from the user with regard to the request to authorize release of this information to the brand, which the intent messaging application may provide to the user identification system. The user identification system, at step 726, may evaluate this response to determine whether the user has authorized release of the requested information from the user's account to the brand for creation of a new user-to-brand relationship (e.g., a user account associated with the brand, etc.).

If the user does not authorize release of the information from the user account to the brand, the user identification system, at step 728, may transmit a response to the brand to indicate that the user has not authorized release of the requested information. This may cause the brand to determine that the user cannot be authenticated and/or that the communications session with the user cannot be continued, as the brand is unable to establish a new account for the user.

If the user has authorized release of this information to the brand, the user identification system, at step 730, may release this information to the brand. The brand may use this information to establish a new account for the user and that is associated with the brand. The brand may provide user identifiers and/or tokens corresponding to the newly created user account to the user identification system, which, at step 732, may store these user identifiers and/or tokens in the user profile datastore in association with the user's profile. In some instances, if the brand maintains a set of brand authentication rules that are to be met in order for the user to be deemed authenticated by the brand, the user identification system may further associate these brand authentication rules with the user identifiers and/or tokens associated with the newly created account. Once the newly created account has been created and associated with the user's profile in the user profile datastore, the user identification system, through the intent messaging application, may display a message to the user indicating that a new account has been created with the brand and the account identifiers and/or tokens corresponding to this new account. The process 700 may continue through step 734 to step 710, whereby the user identification system may determine whether the level of identification and authentication for the user has been accepted by the brand, as described above.

Returning to step 718, whereby the user identification system may determine whether the brand has indicated an actual user association with the brand, if the user identification system determines that there is an actual user association with the brand, the user identification system proceed through step 720 to step 736, where the user identification system may indicate that no known record of the user-to-brand relationship exists. For instance, in response to a brand request to verify the identity of the user and to authenticate the user according to the authentication requirements of the brand, the user identification system may indicate that the user profile associated with the user does not include information corresponding to an existing user account associated with the brand. Further, if the user identification system determines that it does not have a record of the existing relationship between the user and the brand, the user identification system, at step 738, can prompt the user (such as through the intent messaging application) to provide their user account credentials corresponding to the user account associated with the brand.

In response to obtaining the user account credentials from the intent messaging application, the user identification system, at step 740, may determine whether these user account credentials are valid. For example, the user identification system may transmit the user account credentials to an authentication server associated with the brand (e.g., an OAuth server, etc.) for user authentication. If the user identification system determines that the provided user account credentials are not valid (e.g., the OAuth server rejects the user account credentials, etc.), the user identification system, at step 742, may indicate an authentication failure. For instance, the user identification system may transmit a notification to the brand to indicate that the user could not be authenticated. This may cause the brand to determine that the user cannot be authenticated and/or that the communications session with the user cannot be continued.

As noted above, if the authentication server associated with the brand determines that the user credentials are valid, the authentication server associated with the brand may return a token or other account identifiers corresponding to the user account associated with the brand. The user identification system may transmit the received token or other account identifiers to the brand to verify that the token or other account identifiers are associated with the user account associated with the brand. If so, the user identification system, at step 744, may persist the token, along with the provided user account credentials, within the user profile associated with the user and stored within the user profile datastore. The process 700 may continue through step 734 to step 710, whereby the user identification system may determine whether the level of identification and authentication for the user has been accepted by the brand, as described above.

Figure 8:
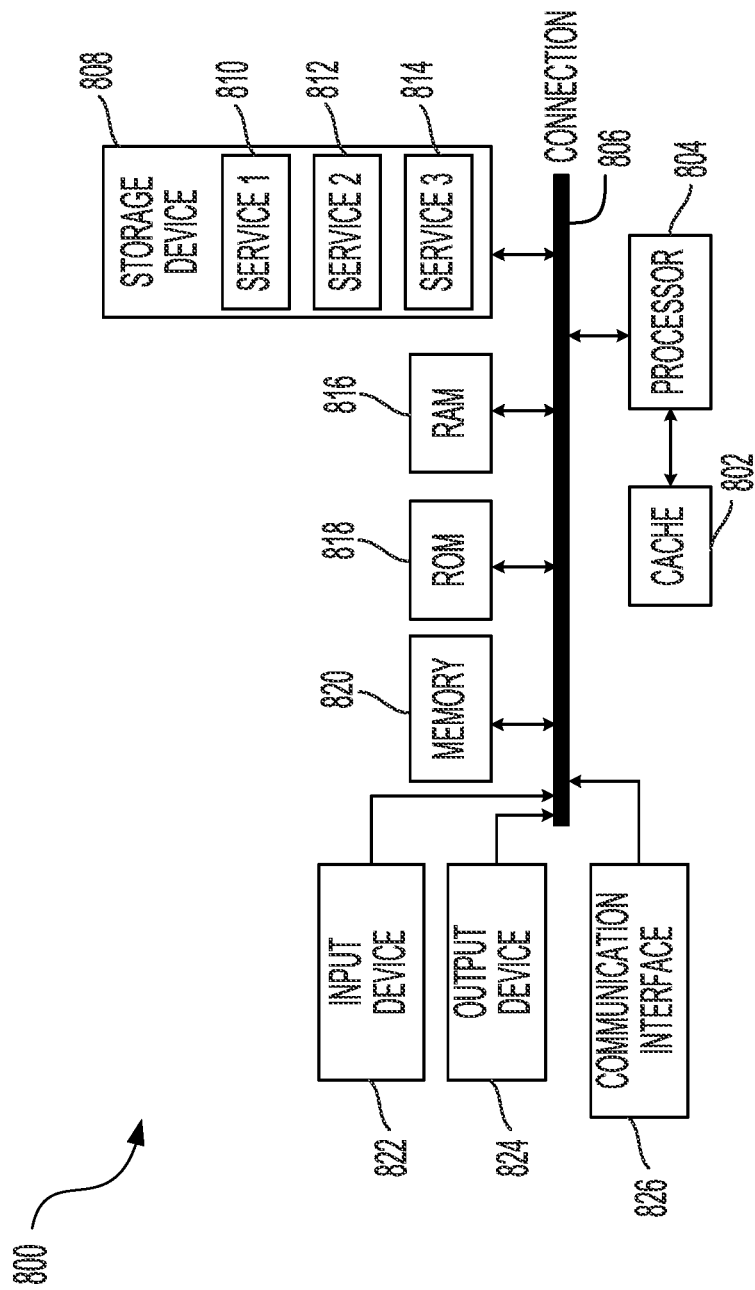
FIG. 8 shows an illustrative example of an environment in which various embodiments can be implemented.

FIG. 8 illustrates a computing system architecture 800 including various components in electrical communication with each other using a connection 806, such as a bus, in accordance with some implementations. Example system architecture 800 includes a processing unit (CPU or processor) 804 and a system connection 806 that couples various system components including the system memory 820, such as ROM 818 and RAM 816, to the processor 804. The system architecture 800 can include a cache 802 of high-speed memory connected directly with, in close proximity to, or integrated as part of the processor 804. The system architecture 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions.

Other system memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system architecture 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system architecture 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, RAMs 816, ROM 818, and hybrids thereof.

The storage device 808 can include services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
    receiving an authentication request to determine a current authentication state associated with a user for an ongoing communications session between the user and an end agent;
    determining the current authentication state associated with the user, wherein the current authentication state corresponds to an authentication associated with the user and corresponding to a platform that facilitates the ongoing communications session between the user and the end agent;
    dynamically training a machine learning algorithm to determine a predicted level of authentication required for the ongoing communications session, wherein the machine learning algorithm is trained by using a dataset of communications exchanged during sample communications sessions and known authentication requirements for the sample communications sessions;
    identifying one or more authentication challenges to obtain a required authentication associated with the user, wherein the one or more authentication challenges are identified through the machine learning algorithm by processing real-time communications exchanged between the user and the end agent during the ongoing communications session;
    generating the identified one or more authentication challenges, wherein when the identified one or more authentication challenges are executed by an application implemented on a computing device associated with the user, the application prompts the user to complete the identified one or more authentication challenges;

obtaining data corresponding to completion of the identified one or more authentication challenges;

determining a new authentication state associated with the user, wherein the new authentication state is determined based on the data;

updating the ongoing communications session according to the new authentication state; and updating the machine learning algorithm using feedback corresponding to the identified one or more authentication challenges.

2. The computer-implemented method of claim 1, further comprising:

providing an identity request to obtain identity information associated with the user, wherein when the identity request is received at the application, the application prompts the user to release the identity information.

3. The computer-implemented method of claim 1, further comprising:

providing identity information associated with the user, wherein when the identity information is received by the end agent, the end agent establishes a new account for the user and one or more identifiers corresponding to the new account; and associating the one or more identifiers with a set of authentication rules associated with the end agent.

4. The computer-implemented method of claim 1, further comprising:

validating a set of credentials corresponding to an account associated with the user and the end agent, wherein the set of credentials are validated using an OAuth server associated with the end agent; and storing one or more identifiers corresponding to the account, wherein the one or more identifiers are provided by the OAuth server.

5. The computer-implemented method of claim 1, wherein the one or more authentication challenges include a request for biometric information associated with the user.

6. The computer-implemented method of claim 1, wherein the one or more authentication challenges include a request for verification of government-issued credentials associated with the user.

7. The computer-implemented method of claim 1, wherein the authentication request includes a set of authentication rules associated with the end agent.

8. The computer-implemented method of claim 1, wherein the authentication request includes an identifier corresponding to the end agent, and wherein the identifier corresponding to the end agent is used to identify a set of authentication rules associated with the end agent.

9. The computer-implemented method of claim 1, further comprising:

providing a set of tokenized account identifiers in response to the completion of the one or more authentication challenges, wherein the set of tokenized account identifiers correspond to an account associated with the user and the end agent, and wherein the set of tokenized account identifiers are used to authenticate the user for other communications sessions between the user and the end agent.

10. The computer-implemented method of claim 1, wherein updating the ongoing communications session according to the new authentication state further comprises:

transmitting a notification indicating the new authentication state, wherein the notification is transmitted through the ongoing communications session.

11. A system, comprising:

one or more processors; and memory storing thereon instructions that, as a result of being executed by the one or more processors, cause the system to:

receive an authentication request to determine a current authentication state associated with a user for an ongoing communications session between the user and an end agent;

determine the current authentication state associated with the user, wherein the current authentication state corresponds to an authentication associated with the user and corresponding to a platform that facilitates the ongoing communications session between the user and the end agent;

dynamically train a machine learning algorithm to determine a predicted level of authentication required for the ongoing communications session, wherein the machine learning algorithm is trained by using a dataset of communications exchanged during sample communications sessions and known authentication requirements for the sample communications sessions;

identify one or more authentication challenges to obtain a required authentication associated with the user, wherein the one or more authentication challenges are identified through the machine learning algorithm by processing real-time communications exchanged between the user and the end agent during the ongoing communications session;

generate the identified one or more authentication challenges, wherein when the identified one or more authentication challenges are executed by an application implemented on a computing device associated with the user, the application prompts the user to complete the identified one or more authentication challenges;

obtain data corresponding to completion of the identified one or more authentication challenges;

determine a new authentication state associated with the user, wherein the new authentication state is determined based on the data;

update the ongoing communications session according to the new authentication state; and update the machine learning algorithm using feedback corresponding to the identified one or more authentication challenges.

12. The system of claim 11, wherein the instructions further cause the system to:

provide an identity request to obtain identity information associated with the user, wherein when the identity request is received at the application, the application prompts the user to release the identity information.

13. The system of claim 11, wherein the instructions further cause the system to:

provide identity information associated with the user, wherein when the identity information is received by the end agent, the end agent establishes a new account for the user and one or more identifiers corresponding to the new account; and associate the one or more identifiers with a set of authentication rules associated with the end agent.

14. The system of claim 11, wherein the instructions further cause the system to:

validate a set of credentials corresponding to an account associated with the user and the end agent, wherein the set of credentials are validated using an OAuth server associated with the end agent; and store one or more identifiers corresponding to the account, wherein the one or more identifiers are provided by the OAuth server.

15. The system of claim 11, wherein the one or more authentication challenges include a request for biometric information associated with the user.

16. The system of claim 11, wherein the one or more authentication challenges include a request for verification of government-issued credentials associated with the user.

17. The system of claim 11, wherein the authentication request includes a set of authentication rules associated with the end agent.

18. The system of claim 11, wherein the authentication request includes an identifier corresponding to the end agent, and wherein the identifier corresponding to the end agent is used to identify a set of authentication rules associated with the end agent.

19. The system of claim 11, wherein the instructions further cause the system to:
provide a set of tokenized account identifiers in response to the completion of the one or more authentication challenges, wherein the set of tokenized account identifiers correspond to an account associated with the user and the end agent, and wherein the set of tokenized account identifiers are used to authenticate the user for other communications sessions between the user and the end agent.

20. The system of claim 11, wherein the instructions that cause the system to update the ongoing communications session according to the new authentication state further cause the system to:
transmit a notification indicating the new authentication state, wherein the notification is transmitted through the ongoing communications session.

21. A non-transitory, computer-readable storage medium storing thereon executable instructions that, as a result of being executed by one or more processors of a computer system, cause the computer system to:
receive an authentication request to determine a current authentication state associated with a user for an ongoing communications session between the user and an end agent;
determine the current authentication state associated with the user, wherein the current authentication state corresponds to an authentication associated with the user and corresponding to a platform that facilitates the ongoing communications session between the user and the end agent;
dynamically train a machine learning algorithm to determine a predicted level of authentication required for the ongoing communications session, wherein the machine learning algorithm is trained by using a dataset of communications exchanged during sample communications sessions and known authentication requirements for the sample communications sessions;
identify one or more authentication challenges to obtain a required authentication associated with the user, wherein the one or more authentication challenges are identified through the machine learning algorithm by processing real-time communications exchanged between the user and the end agent during the ongoing communications session;
generate the identified one or more authentication challenges, wherein when the identified one or more authentication challenges are executed by an application implemented on a computing device associated with the user, the application prompts the user to complete the identified one or more authentication challenges;
obtain data corresponding to completion of the identified one or more authentication challenges;
determine a new authentication state associated with the user, wherein the new authentication state is determined based on the data;
update the ongoing communications session according to the new authentication state; and
update the machine learning algorithm using feedback corresponding to the identified one or more authentication challenges.

22. The non-transitory, computer-readable storage medium of claim 21, wherein the executable instructions further cause the computer system to:
provide an identity request to obtain identity information associated with the user, wherein when the identity request is received at the application, the application prompts the user to release the identity information.

23. The non-transitory, computer-readable storage medium of claim 21, wherein the executable instructions further cause the computer system to:
provide identity information associated with the user, wherein when the identity information is received by the end agent, the end agent establishes a new account for the user and one or more identifiers corresponding to the new account; and
associate the one or more identifiers with a set of authentication rules associated with the end agent.

24. The non-transitory, computer-readable storage medium of claim 21, wherein the executable instructions further cause the computer system to:
validate a set of credentials corresponding to an account associated with the user and the end agent, wherein the set of credentials are validated using an OAuth server associated with the end agent; and
store one or more identifiers corresponding to the account, wherein the one or more identifiers are provided by the OAuth server.

25. The non-transitory, computer-readable storage medium of claim 21, wherein the one or more authentication challenges include a request for biometric information associated with the user.

26. The non-transitory, computer-readable storage medium of claim 21, wherein the one or more authentication challenges include a request for verification of government-issued credentials associated with the user.

27. The non-transitory, computer-readable storage medium of claim 21, wherein the authentication request includes a set of authentication rules associated with the end agent.

28. The non-transitory, computer-readable storage medium of claim 21, wherein the authentication request includes an identifier corresponding to the end agent, and wherein the identifier corresponding to the end agent is used to identify a set of authentication rules associated with the end agent.

29. The non-transitory, computer-readable storage medium of claim 21, wherein the executable instructions further cause the computer system to:
provide a set of tokenized account identifiers in response to the completion of the one or more authentication challenges, wherein the set of tokenized account identifiers correspond to an account associated with the user and the end agent, and wherein the set of tokenized account identifiers are used to authenticate the user for other communications sessions between the user and the end agent.

30. The non-transitory, computer-readable storage medium of claim 21, wherein the executable instructions that cause the computer system to update the ongoing communications session according to the new authentication state further cause the computer system to:
   transmit a notification indicating the new authentication state, wherein the notification is transmitted through the ongoing communications session.

\* \* \* \* \*